US012482343B2

(12) United States Patent
Rajkovic et al.

(10) Patent No.: US 12,482,343 B2
(45) Date of Patent: Nov. 25, 2025

(54) CONSOLIDATED ALARM SCREEN

(71) Applicant: SimpliSafe, Inc., Boston, MA (US)

(72) Inventors: Bojan Rajkovic, Salem, MA (US); Gregory Eusden, Cambridge, MA (US)

(73) Assignee: SimpliSafe, Inc., Boston, MA (US)

( * ) Notice: Subject to any disclaimer, the term of this patent is extended or adjusted under 35 U.S.C. 154(b) by 24 days.

(21) Appl. No.: 18/786,694

(22) Filed: Jul. 29, 2024

(65) Prior Publication Data

US 2025/0140103 A1 May 1, 2025

Related U.S. Application Data

(63) Continuation of application No. 18/433,620, filed on Feb. 6, 2024, now Pat. No. 12,073,706.

(60) Provisional application No. 63/594,546, filed on Oct. 31, 2023.

(51) Int. Cl.
*G08B 25/01* (2006.01)
*G08B 25/00* (2006.01)

(52) U.S. Cl.
CPC ......... *G08B 25/016* (2013.01); *G08B 25/001* (2013.01); *G08B 25/006* (2013.01)

(58) Field of Classification Search
CPC .................................................... G08B 25/016
See application file for complete search history.

(56) References Cited

U.S. PATENT DOCUMENTS

| | | | | |
|---|---|---|---|---|
| 5,398,277 | A * | 3/1995 | Martin, Jr. ........... | G08B 25/001 379/39 |
| 8,830,052 | B2 | 9/2014 | Nakaya et al. | |
| 9,218,729 | B2 | 12/2015 | Meganathan | |
| 9,984,558 | B2 | 5/2018 | Artes et al. | |
| 10,909,839 | B1 * | 2/2021 | Kursar ................. | G08B 25/016 |
| 11,595,241 | B2 | 2/2023 | Dziduch et al. | |
| 11,908,196 | B1 | 2/2024 | Sundell et al. | |
| 2013/0305103 | A1 | 11/2013 | Carey et al. | |
| 2014/0320312 | A1 | 10/2014 | Sager et al. | |
| 2015/0154854 | A1 | 6/2015 | Morehead | |
| 2018/0053394 | A1 * | 2/2018 | Gersten .................. | G08B 17/08 |
| 2019/0124469 | A1 * | 4/2019 | Roy ....................... | G08B 21/02 |
| 2019/0164412 | A1 | 5/2019 | Kennedy-Foster et al. | |
| 2020/0105120 | A1 * | 4/2020 | Werner ................ | G08B 25/006 |
| 2020/0226913 | A1 * | 7/2020 | Delgado .................. | G08B 7/06 |
| 2021/0005076 | A1 * | 1/2021 | Delgado .................. | G08B 3/10 |
| 2021/0366267 | A1 | 11/2021 | Connell, II et al. | |

(Continued)

OTHER PUBLICATIONS

U.S. Appl. No. 18/895,668, Notice of Allowance dated Dec. 16, 2024 (9 pages).

(Continued)

*Primary Examiner* — Travis R Hunnings
(74) *Attorney, Agent, or Firm* — Finch & Maloney PLLC

(57) ABSTRACT

A method includes receiving, by a computing device, first data from a sensor, the first data including a first timestamp and an event that triggered an alarm; receiving, by the computing device, second data from a remote computing environment, the second data including a second timestamp different from the first time stamp and specifying an action taken in response to the alarm; and rendering a screen on a display of a computing device, the screen including the first and second data represented as a sequence of events ordered by time based on the first and second timestamps.

20 Claims, 18 Drawing Sheets

(56) References Cited

U.S. PATENT DOCUMENTS

| | | | |
|---|---|---|---|
| 2022/0051548 | A1 | 2/2022 | Pellegrini et al. |
| 2022/0198913 | A1 | 6/2022 | Thompson et al. |

OTHER PUBLICATIONS

U.S. Appl. No. 18/895,668, "Alarm Platform with Aggregated Alarm Events", filed Sep. 25, 2024 (111 pages).
International Search Report and Written Opinion, International Patent Application PCT/US2024/051908, 19 pages, May 15, 2025.
Communication Relating to the Results of the Partial International Search and Provisional Opinion Accompanying the Partial Search Result, PCT Application PCT/US2024/051908 (8 pages) (mailed Feb. 20, 2025).

* cited by examiner

CONSOLIDATED ALARM SCREEN

CROSS REFERENCE TO RELATED APPLICATIONS

This is a continuation of U.S. patent application Ser. No. 18/433,620 (filed 6 Feb. 2024), which claims the benefit of U.S. Provisional Patent Application 63/594,546 (filed 31 Oct. 2023). Both of these priority applications are hereby incorporated herein by reference in their entirety.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for provision and handling of a consolidated alarm screen. At least one example is directed to a method. The method includes receiving, by a computing device, first data from a sensor, the first data including a first timestamp and an event that triggered an alarm; receiving, by the computing device, second data from a remote computing environment, the second data including a second timestamp different from the first timestamp and specifying an action taken in response to the alarm; and rendering a screen on a display of the computing device, the screen including the first and second data represented as a sequence of events ordered by time based on the first and second timestamps.

Another example is directed to a system including a memory; a network interface; and at least one processor coupled with the memory and the network interface. The at least one processor is configured to receive, via the network interface, first data including a first timestamp and an event that triggered an alarm; receive, via the network interface, second data from a remote computing environment, the second data including a second timestamp different from the first timestamp and specifying an action taken in response to the alarm; and communicate, via the network interface for rendering on a remote device, a sequence of events based on the first and second data and ordered by time based on the first and second timestamps.

Another example is directed to a method that includes rendering, by the computing device, a screen including a first control displaying a representation of a sequence of events regarding an alarm, a second control configured to receive user input cancelling the alarm, and a third control configured to receive user input escalating the alarm; receiving, by the computing device via the second control, the user input cancelling the alarm; and communicating, to a remote computing device, a request to cancel the alarm in response to reception of the user input cancelling the alarm.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
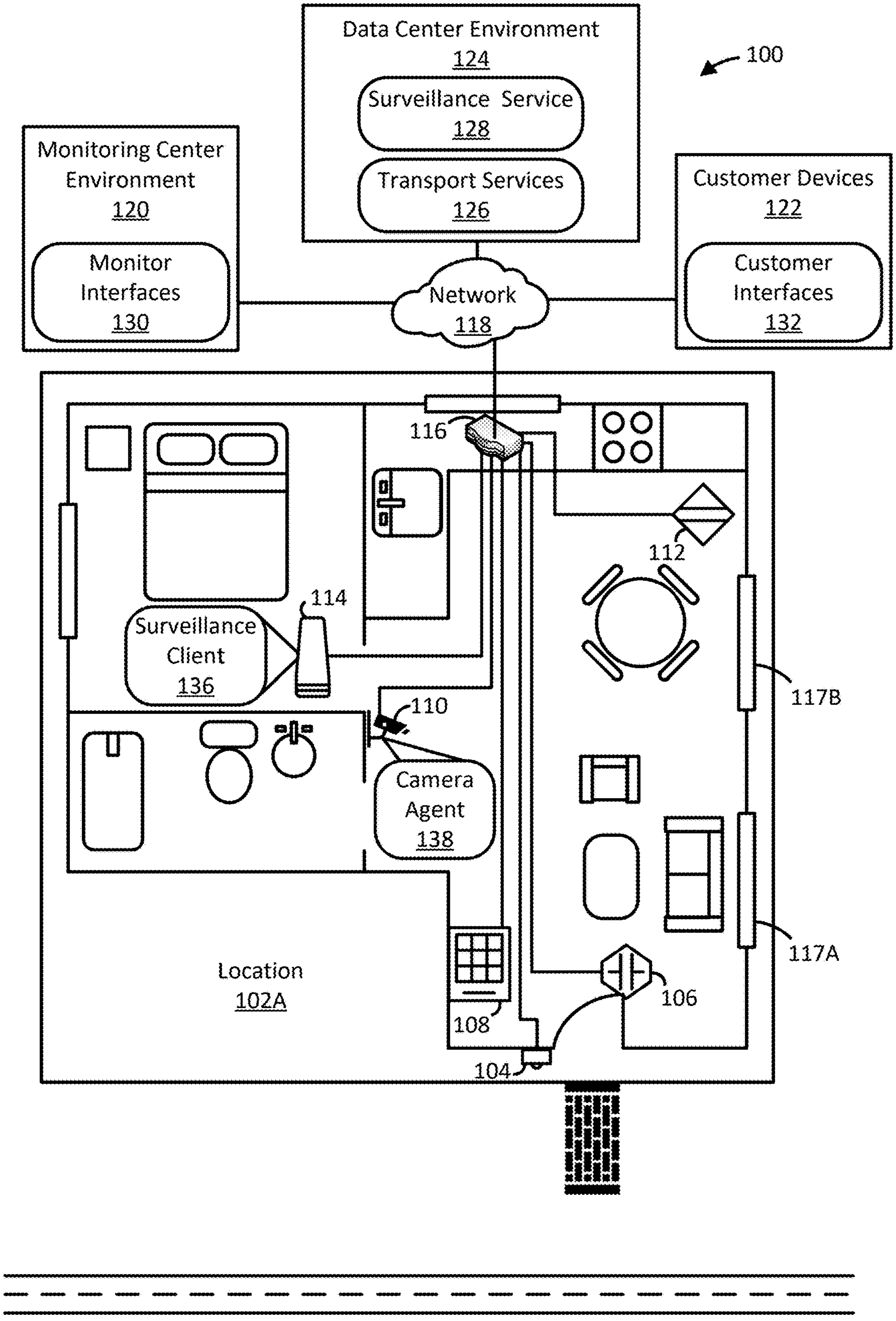
FIG. 1 is a schematic diagram of a security system, according to some examples described herein.

As summarized above, at least some examples disclosed herein are directed to security systems and processes that provide customers with an organized, holistic view of individual alarm incidents raised by the security system and tools helpful to address these alarms. For instance, in some examples, the security systems and processes described herein compile information from a variety of sources into an alarm screen (e.g., a consolidated alarm screen) that includes controls that display events that triggered an alarm and actions taken to address the alarm and controls that enable the customer to take action. The sources tapped to create the consolidated alarm screen include security devices at a location that raised the alarm, computing devices utilized by monitoring personnel, and computing devices utilized by customers. The incorporation of data generated from these diverse sources sets at least some implementations of the consolidated alarm screen apart from other alarm screens that report information from a single, or otherwise limited, set of sources and, thus, provide an incomplete view of the alarm. Further, the actionable controls included in the consolidated alarm screen include buttons to dispatch first responders to the location or, alternatively, to cancel the alarm. The unique combination of elements present in some examples of the consolidated alarm screen provide unprecedented transparency regarding actions taken by the various actors involved in addressing alarms and empower the user to contribute to efficient and effective disposition of the alarms.

There are many actors involved in handling alarms. These actors include the overall security system, location-based devices (e.g., cameras and other sensors) included in the security system, customers of the security system, contacts associated with the customers, monitoring personnel who keep watch over locations protected by the security system, dispatchers who interact with the monitoring personnel, and first responders who interact with the dispatchers and visit the locations, to name a few. These actors may work quasi-independently to handle alarms and, in doing so, may interact with various automation, such as mobile phone apps, text messaging, monitoring applications, computer-aided dispatch systems, and other automation.

The actions that can be taken by these actors are sundry. A few specific examples follow. At a monitored location, a sensor other than the sensor that triggered an alarm may be concurrently or subsequently triggered and therefore may supply additional information useful in resolving the alarm. For instance, a motion sensor may be triggered subsequent to a door sensor that triggered the alarm. A customer may disarm their location-based devices. A customer may escalate a priority of the alarm using a panic button. A customer contact may request dispatch of emergency services through a text message. A customer contact may request that the alarm be cancelled via a smartphone app. Monitoring personnel may initiate a call with a customer contact. Monitoring personnel may initiate a live, interactive communication session with someone at the monitored location. Monitoring personnel may request dispatch of a first responder from a dispatcher. Monitoring personnel may cancel a requested dispatch via the dispatcher. A first responder may arrive at the monitored location.

Without context, customers don't know what actions have been taken during an alarm event by the monitoring center to handle the alarm and therefore don't have the requisite information to assist with alarm handling. As an example, one customer contact might be engaged in a phone call with monitoring personnel while another customer contact is considering how to respond to an SMS text message. If monitoring personnel receive contradictory or incorrect information from different customer contacts, then the alarm may not be properly handled, or the resolution thereof might be delayed.

In view of these challenges, as well as others, the security systems and processes described herein aggregate information regarding the activities of the actors set forth above into a consolidated alarm screen that includes a single real-time timeline. In some examples, the consolidated alarm screen is presented to the customer via a customer interface, such as a mobile app, thus providing the customer with insight as to what is being done to handle an alarm and the current state of the alarm. In alarm situations, time is of the essence as wrongdoers can quickly steal or damage customer property. Alternatively, customers may have limited time (e.g., 30 seconds or less) to cancel false alarms and prevent wasteful use of emergency services, such as dispatchers and first responders. The succinct presentation of information described herein regarding the alarm better informs the customer as to the state of an alarm and helps the customer efficiently and properly triage and dispose of the alarm. This feature, in turn, results in more efficient use of emergency services by reducing the number of dispatches that occur to false alarms.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 16). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figure 2:
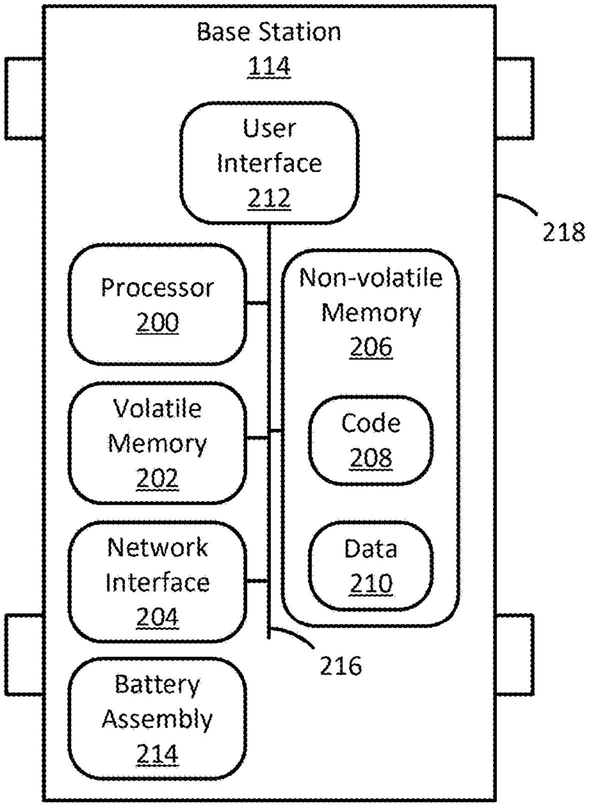
FIG. 2 is a schematic diagram of a base station, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868

MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touch-screen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Figure 3:
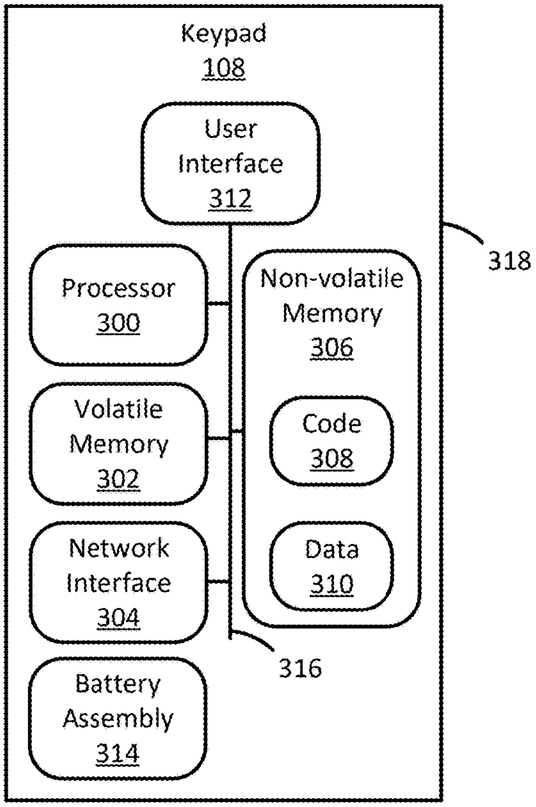
FIG. 3 is a schematic diagram of a keypad, according to some examples described herein.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
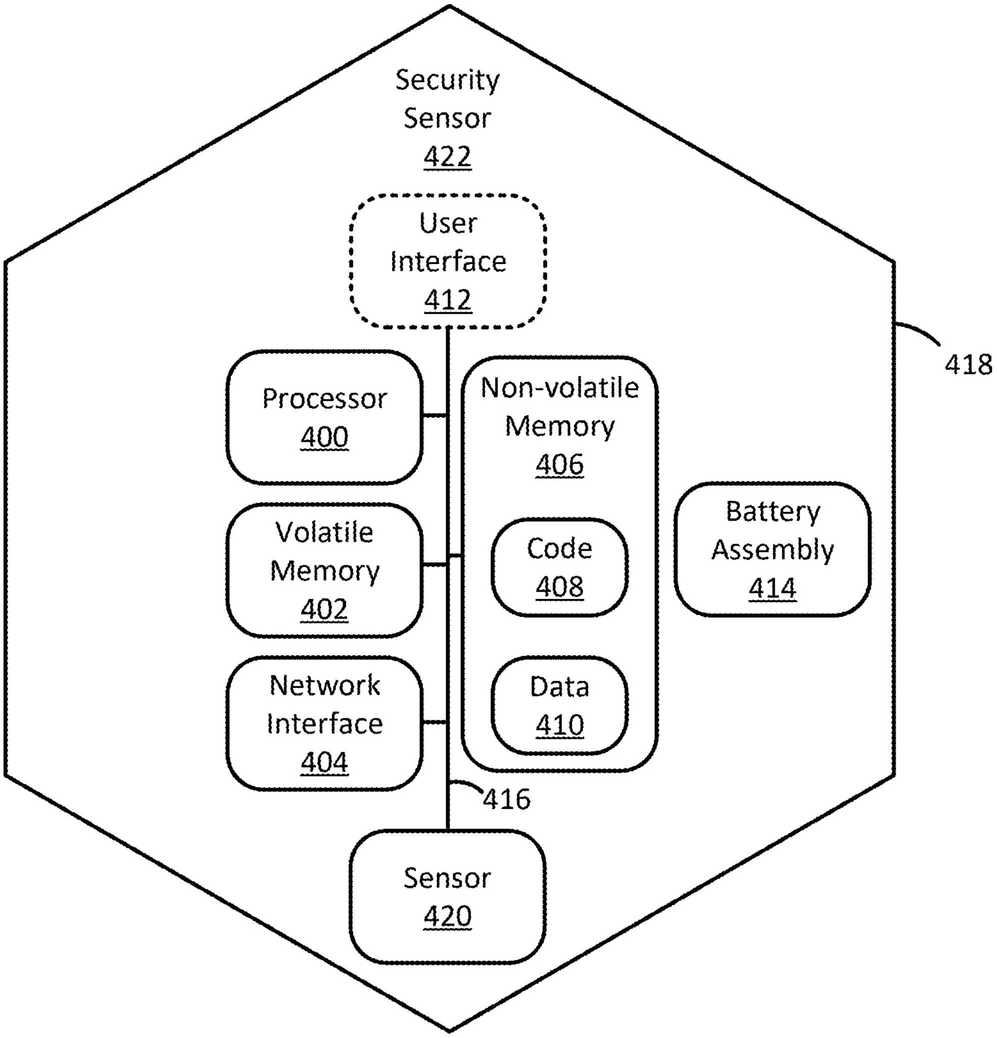
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
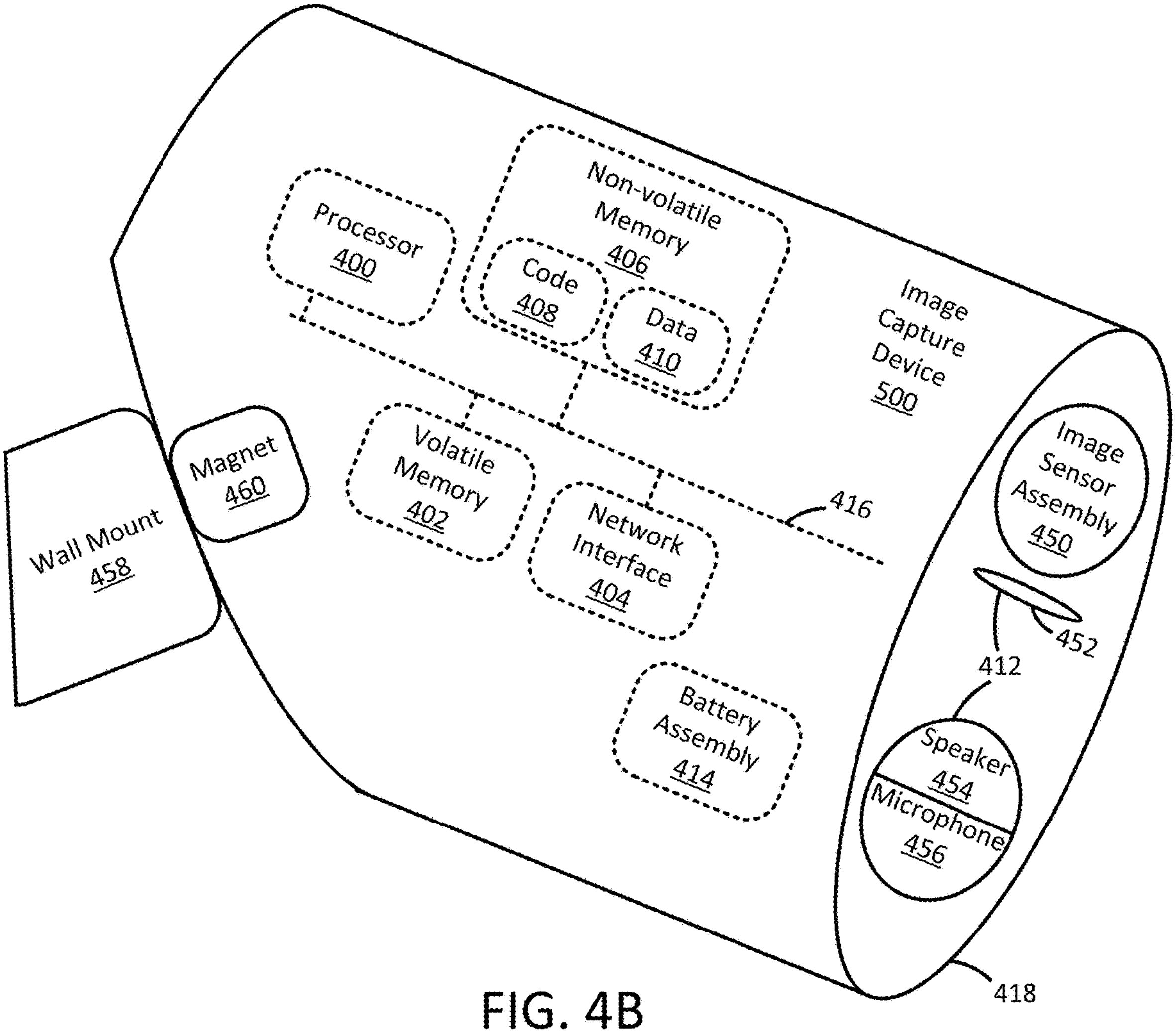
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
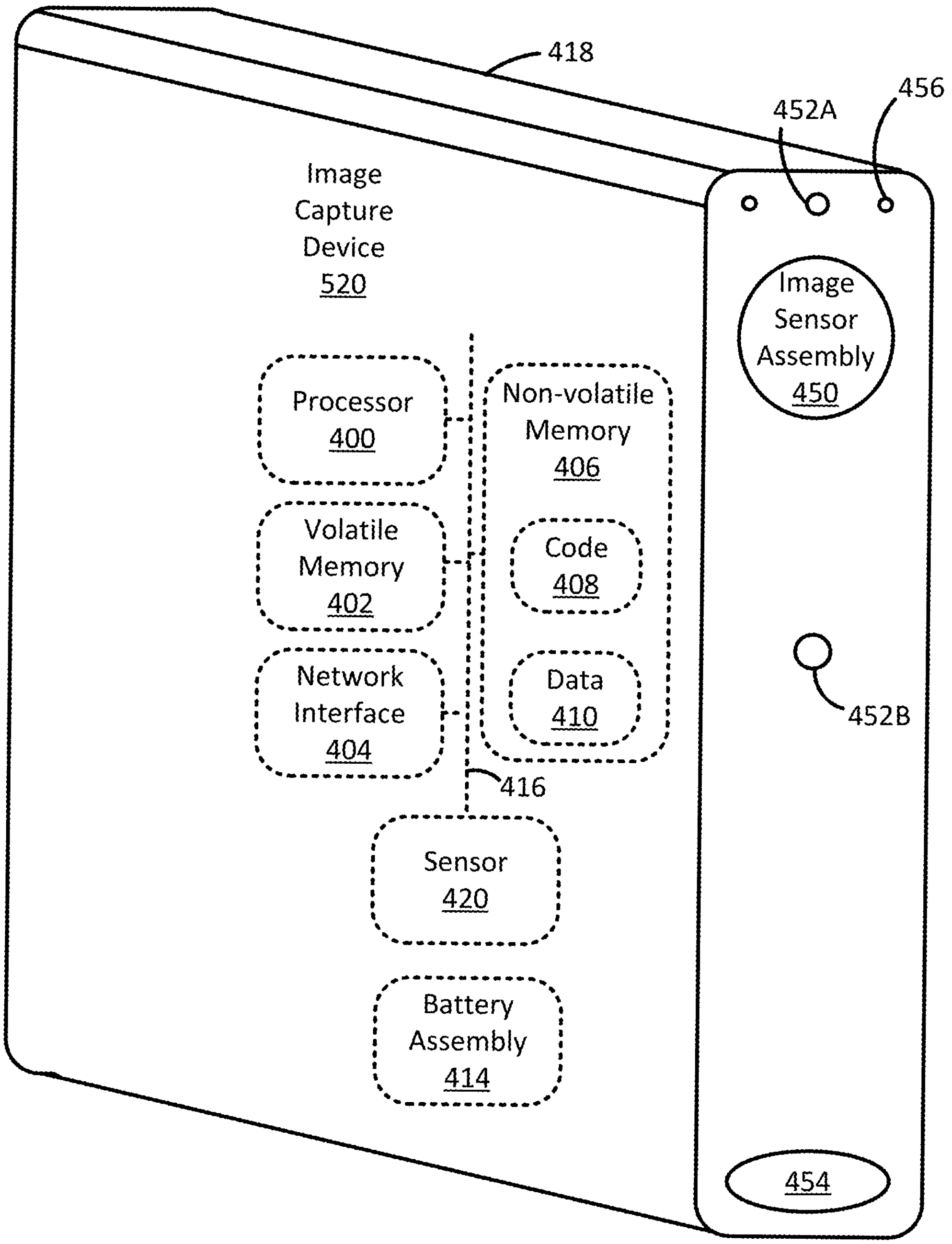
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
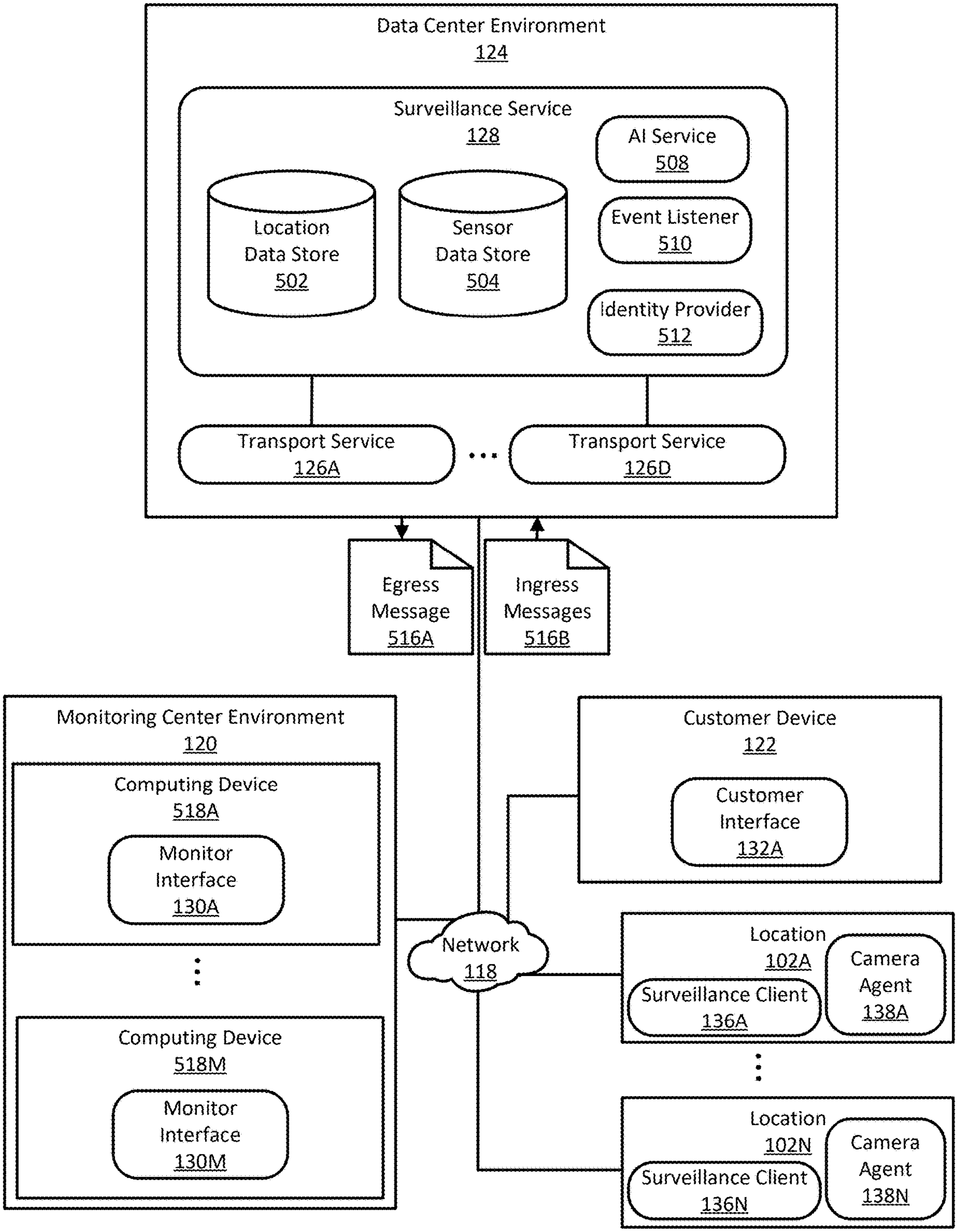
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers (for example, user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
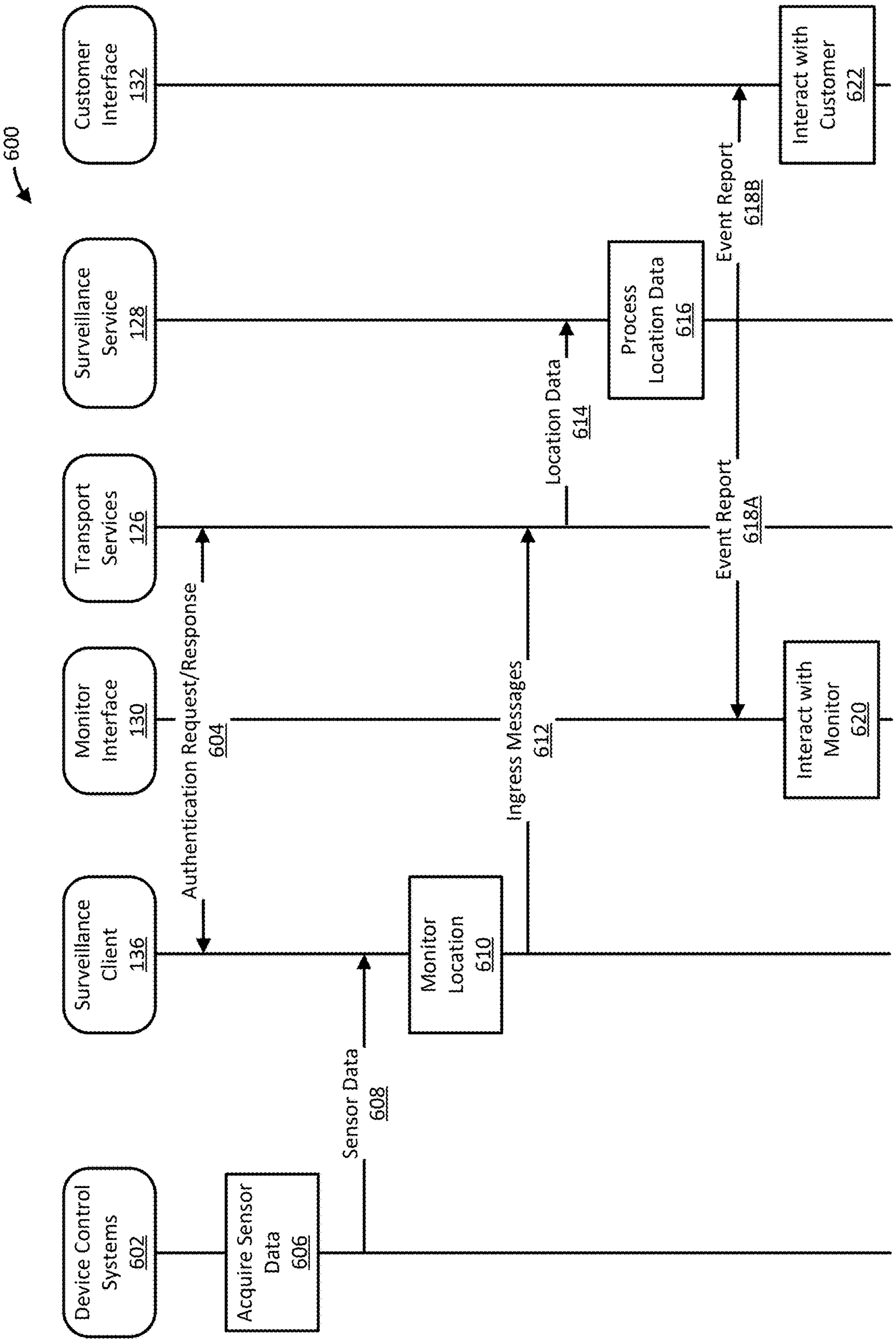
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
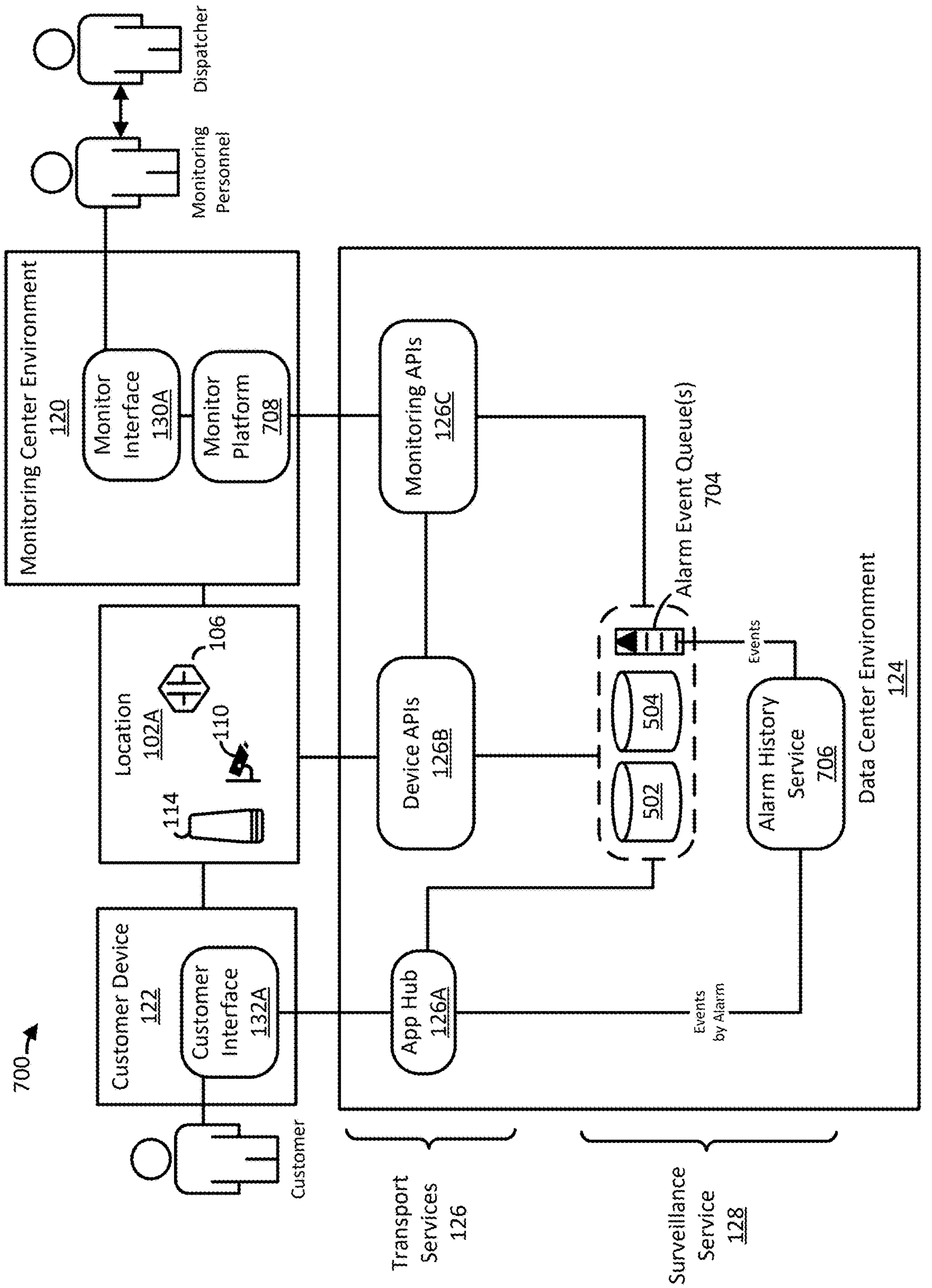
FIG. 7 is a schematic diagram of select portions of the security system of FIG. 1 that are configured to implement a customer interface with a consolidated alarm screen, according to some examples described herein.

Turning now to FIG. 7, parts 700 of a security system (e.g., the security system 100 of FIG. 1) that are configured to implement a customer interface with a consolidated alarm screen are schematically illustrated. These parts include the data center environment 124 of FIG. 1, the monitoring center environment 120 of FIG. 1, one of the customer devices 122 of FIG. 1, and a monitored location 102A of FIG. 1. As shown in FIG. 7, the data center environment 124 hosts portions of the surveillance service 128 including the location data store 502 of FIG. 5, the sensor data store 504 of FIG. 5, one or more alarm event queues 704, and an alarm history service 706. The data center environment 124 further hosts portions of the transport services 126 including an app hub 126A, one or more device APIs 126B, and one or more monitoring APIs 126C. The monitoring center environment 120 includes at least one computing device that hosts a monitor interface 130A and at least one computing device that hosts a monitor platform 708. The location 102A includes a base station 114, an image capture device 110, and a sensor 106. The base station 114 may host a surveillance client (e.g., the surveillance client 136 of FIG. 1; not shown in FIG. 7). The image capture device 110 may host a software camera agent (e.g., the camera agent 138 of FIG. 1; not shown in FIG. 7). The sensor 106 may host a DCS (e.g., as described above with reference to FIG. 4A). As will be apparent in view of this disclosure, the location-based devices 114, 110, and 106 are illustrated by way of example only and the location 102A may omit any of these devices or include other devices. Similarly, examples illustrated by FIG. 7 are not limited to a single customer device 122, location 102A, or monitoring center environment 120.

Figure 8:
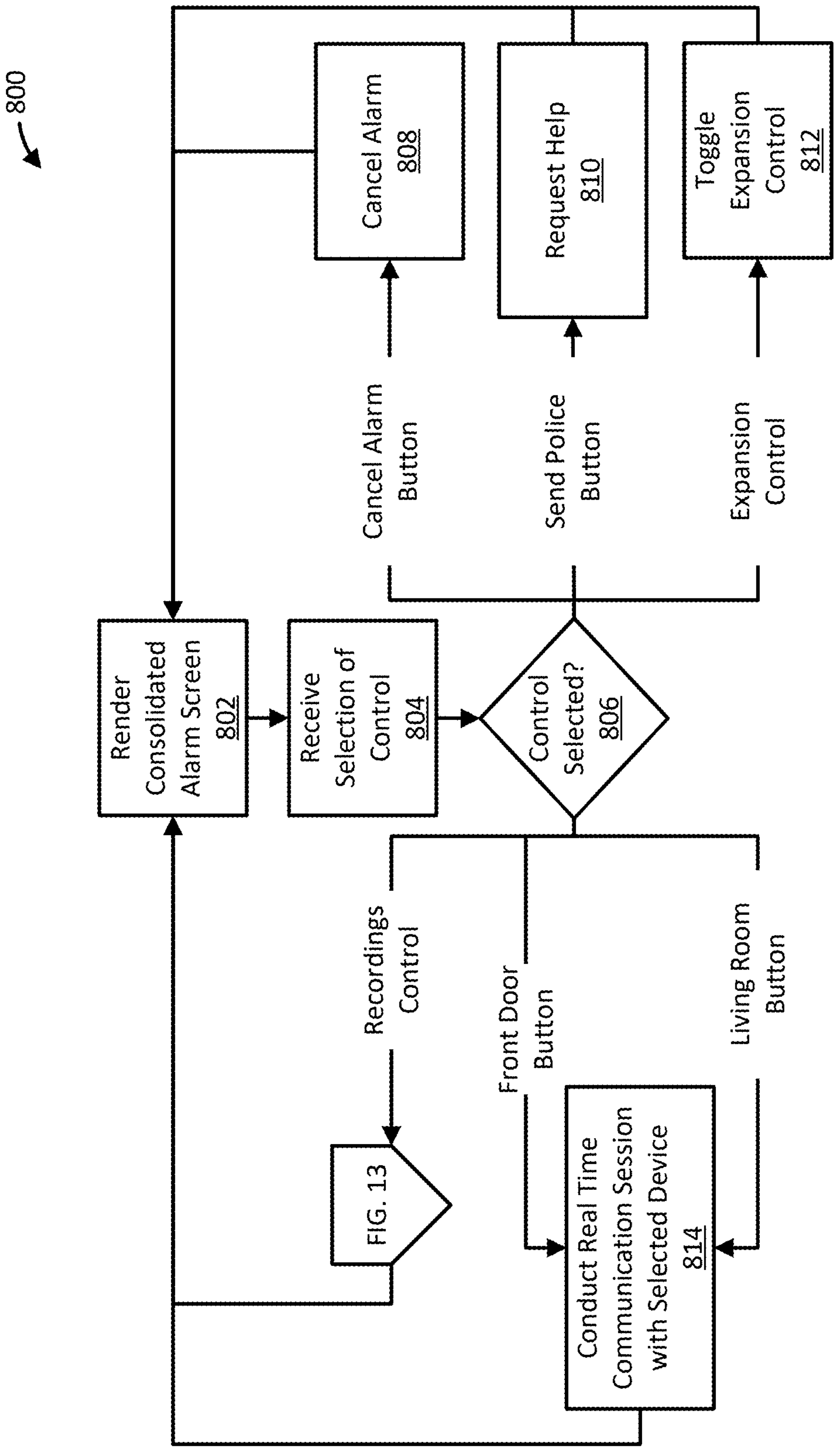
FIG. 8 is a flow diagram illustrating a process for provisioning and handling of a consolidated alarm screen, according to some examples described herein.
Figure 9:
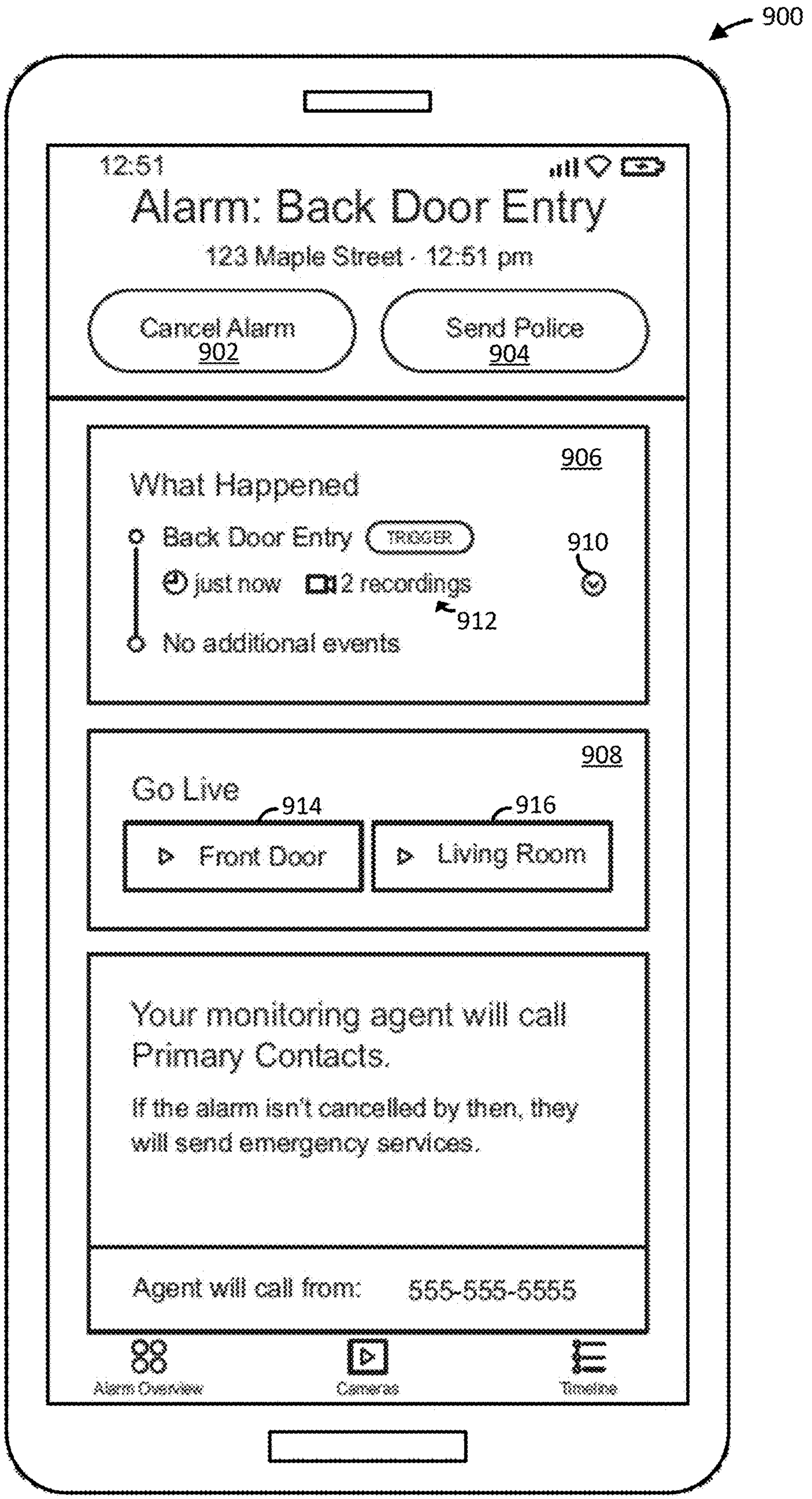
FIG. 9 is a front view of a consolidated alarm screen, according to some examples described herein.

As shown in FIG. 7, the customer interface 132A comprises an application ("app") that is hosted by the customer device 122. In some examples, the customer interface 132A is configured to interact with a customer to both receive input and render output regarding aspects of the security system accessible to the customer. For instance, in certain examples, the customer interface 132A is configured to control its host to render a consolidated alarm screen with controls configured to display a chronology of actions taken by the various actors involved in handling an alarm. This chronology can include information such as an event that triggered the alarm, events that occurred subsequent to the triggering event, and a current status of the alarm. In certain examples, the consolidated alarm screen also includes additional controls configured to enable a customer to take actions related to the alarm, such as accessing video recordings related to the alarm (e.g., as may be stored in the location data store 502 and/or the sensor data store 504), requesting help regarding the alarm, and canceling the alarm, both with regard to location-based devices and remote monitoring personnel. FIG. 9, which is described further below, illustrates one example of a consolidated alarm screen 900 that a device hosting the customer interface 132A can render in some examples. Examples of processes that the customer interface 132A is configured to implement in various examples are described further below with reference to FIGS. 8-15.

Continuing with the example of FIG. 7, the location-based devices 114, 110, and 106 are configured to detect events (e.g., reportable events) that occur within the location 102A and communicate messages regarding the events and other location data to the surveillance service 128 via the device APIs 126B. This other location data can include, for example, audio-visual sensor data acquired by the image capture device and arm/disarm events processed by the location-based devices. Table 1 lists examples of types of events that the location-based devices are configured to communicate to the surveillance service 128 according to some examples.

TABLE 1

| Reportable Event | Description |
|---|---|
| Panic_Button | This event is reported if an alarm is triggered by user selection of a panic button associated with the location. |
| Alarm | This event is reported if the base station enters an alarm state due to reception of a trigger signal from an armed location-based device (e.g., a contact sensor, glass break sensor, motion sensor, camera, etc.). |
| Alarm_Stopped | This event is reported if a "stoppable" alarm (e.g., an alarm triggered by detection of an occurrence other than a human threat) is stopped. Examples of "stoppable" alarms include carbon-monoxide alarms, smoke alarms, water/moisture alarms, temperature/freeze alarms, and the like. |
| Medical_Alarm | This event is reported if an alarm is triggered by user selection of a medical alarm, such as via a keypad, key fob, or panic button. |
| Fire_Alarm | This event is reported if an alarm is triggered by user selection of a fire alarm, such as via a keypad, key fob, or panic button. |
| Power_Event | This event is reported if a change to line power is detected. |
| Camera_Event | This event is reported if an alarm is triggered by an image capture device, such as may occur by detection of motion, a human threat, or the like. |
| Cancel_Alarm | This event is reported if an alarm is canceled (e.g., by a user via a location-based device, the customer interface, or the monitor interface). |
| System_Off | This event is reported if the location-based devices are disarmed. |
| System_Home | This event is reported if the location-based devices are selectively armed and disarmed according to a set of user preferences that accommodate a user's physical presence at the location. |
| System_Away | This event is reported if the location-based devices are armed. |
| Personnel_Actions | This event is reported if monitoring personnel access any of the location-based devices. |

Continuing with the example of FIG. 7, the monitor interface 130A comprises a browser-based application or portal hosted by computing devices within the monitoring center environment 120 and served by the monitor platform 708. The monitor interface 130A is configured to interact with monitoring personnel to both receive input and render output regarding alarms triggered at monitored locations, such as the location 102A. For instance, in some examples, the monitor interface 130A is configured to notify monitoring personnel of the occurrence of alarms at monitored locations, render audio-visual data and other sensor data collected by location-based devices at the monitored locations and stored in the data stores 502 and/or 504, and establish real time connections with location-based devices. Further, in some examples, the monitor interface 130A includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Safety Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130A, into events that are communicated to the surveillance service 128 via the monitoring APIs 126C. Table 2 lists examples of types of events that monitor interface 130A is configured to communicate to the surveillance service 128 according to some examples.

TABLE 2

| Reportable Event | Description |
|---|---|
| Alarm_Accessed | This event is reported if the monitor interface receives input specifying monitoring personnel began handling an alarm. |
| Alarm_Verified | This event is reported if the monitor interface receives input specifying monitoring personnel verified authenticity of an alarm. |
| Dispatch_Fire | This event is reported if the monitor interface receives input specifying that fire department personnel were dispatched to a location. |
| Dispatch_Medical | This event is reported if the monitor interface receives input specifying that emergency medical services were dispatched to a location. |
| Dispatch_Police | This event is reported if the monitor interface receives input specifying that police department personnel were dispatched to a location. |
| Dispatch_Update | This event is reported if the monitor interface receives input specifying an update to dispatch status (e.g., initiated, on-site, canceled, completed, etc.). |
| Customer_Contact | This event is reported if the monitor interface receives input specifying monitoring personnel interacted with a customer or customer contact. |
| Customer_Contact_Failed | This event is reported if the monitor interface receives input specifying monitoring personnel were unable to reach a customer or customer contact. |
| Invalid_Safeword | This event is reported if the monitor interface receives input specifying a customer or customer contact responded to a security challenge with an unrecognized response. |
| Threat_Contact | This event is reported if the monitor interface receives input specifying monitoring personnel interacted (e.g., within a real time communication session via a location-based device) with a threat at the location. |
| Alarm_Update | This event is reported if the monitor interface receives input specifying an update to alarm status (e.g., triggered, under investigation, cancelled, completed, etc.). |

Examples of processes that the monitor interface 130A is configured to implement in various examples are described further below with reference to FIG. 15.

Continuing with the example of FIG. 7, the monitor platform 708 is configured to interoperate with a plurality of monitor interfaces, including the monitor interface 130A. In some examples where the monitor interface 130A is a browser-based application, the monitor platform 708 serves the monitor interface 130A to a browser executing on a computing device accessible by monitoring personnel. Alternatively or additionally, in certain examples, the monitor platform 708 operates as a service to a specialized, native version of the monitor interface 130A executing on the computing device accessible by monitoring personnel. Regardless of its particular method of implementation, the monitor platform 708 exchanges messages with the monitor interface 130A to drive workflows conducted by monitoring personnel (e.g., reviewing alarms raised at monitored locations, contacting monitoring service customers, contacting dispatchers, following up on alarms, canceling false alarms, closing out fully addressed alarms, etc.). In some examples, the monitor platform 708 includes an alarm queue that stores data representative of alarms currently being handled by monitoring personnel. In these examples, the alarm queue may identify individual alarms and may prioritize the alarms for urgency in handling, relative to one another.

As shown in FIG. 7, the monitor platform 708 is further configured to interoperate with the monitoring APIs 126C. For instance, in some examples, the monitor platform 708 is configured to exchange messages with the monitoring APIs 126C that generate events (e.g., reportable events). These events may result, for example, from actions taken by monitoring personnel as part of the workflows they perform. These events may include, for instance, initiation or escalation of an alarm initiated by monitoring personnel. Examples of processes that the monitor platform 708 is configured to implement in various examples are described further below with reference to FIGS. 11-12B.

Continuing with the example of FIG. 7, the app hub 126A is configured to interoperate with the customer interface 132A to exchange ingress messages (e.g., the ingress messages 516B of FIG. 5) and egress messages (e.g., the egress messages 516A of FIG. 5) with the customer interface 132A. For instance, in some examples, the app hub 126A establishes a WebSocket connection with the customer interface 132A, and the two processes communicate the ingress and egress messages therein. Alternatively or additionally, at least some of the ingress and egress messages are communicated via API (e.g., REST API) calls. The ingress and egress messages may include location data specifying alarms and any of the events associated therewith, as described herein, as well as requests to cancel an alarm or send help to a location. More particularly, in some examples, the app hub 126A interoperates with both the customer interface 132A and the alarm history service 706 to supply the consolidated alarm screen 900 described further below with reference to FIG. 9 with a comprehensive list of events related to a particular alarm. This list may include, for example, a sequence of events ordered by timestamp. Examples of processes that the app hub 126A is configured to implement in various examples are described further below with reference to FIGS. 10-12B.

Continuing with the example of FIG. 7, the device APIs 126B are configured to interoperate with the location-based devices 114, 110, and 106 at the location 102A to exchange ingress messages (e.g., the ingress messages 516B of FIG. 5) and egress messages (e.g., the egress messages 516A of FIG. 5) with the location-based devices 114, 110, and 106. For instance, in some examples, the device APIs 126B establish WebSocket connections with DCS processes hosted by the location-based devices 114, 110, and/or 106, and the connected DCS processes communicate the ingress and egress messages via the WebSocket connections. The ingress and egress messages may include data specifying alarms and any of the events associated therewith, as described herein. In some examples, the device APIs 126B are further configured to interoperate with the data stores 502 and/or 504 to store event and/or sensor data received from the location 102A. In these examples, the device APIs 126B are also configured to interoperate with the alarm event queues 704 to place certain events (e.g., reportable events) thereon for processing by the alarm history service 706. These events can be utilized by the alarm history service 706 to build comprehensive lists of events related to particular alarms. Examples of processes that the device APIs 126B are configured to implement in various examples are described further below with reference to FIGS. 12A and 12B.

Continuing with the example of FIG. 7, the monitoring APIs 126C are configured to interoperate with the monitor platform 708 at the monitoring center environment 120 to exchange ingress messages (e.g., the ingress messages 516B of FIG. 5) and egress messages (e.g., the egress messages 516A of FIG. 5) with the monitor platform 708. For instance, in some examples, the monitoring APIs 126C establish WebSocket connections with the monitor platform 708, and the connected processes communicate the ingress and egress messages via the WebSocket connection. The ingress and egress messages may include data specifying alarms and any of the events associated therewith, as described herein. In some examples, the monitoring APIs 126C are further configured to interoperate with the data stores 502 and/or 504 to manipulate event and sensor data received from the location 102A. In these examples, the monitoring APIs 126C are also configured to interoperate with the alarm event queues 704 to place certain events thereon for processing by the alarm history service 706. These events can be utilized by the alarm history service 706 to build comprehensive lists of events related to particular alarms. Examples of processes that the monitoring APIs 126C are configured to implement in various examples are described further below with reference to FIGS. 11-12B. It should be noted that, in some examples, the monitoring APIs 126C support the Automated Secure Alarm Protocol and are configured to receive messages including events from computer-aided dispatch systems operated by PSAPs and to add the events to the alarm event queues 704.

Continuing with the example of FIG. 7, the one or more alarm event queues 704 includes one or more data structures and, in certain examples, surrounding services that support enqueuing and dequeuing of member data structures that house events (e.g., reportable events). The alarm event queues may be implemented using any of a variety of queuing technologies such as KAFKA, IBM MQ, and AMAZON MQ to name a few. In some examples, the one or more alarm event queues 704 include a first queue for events inbound from the device APIs 126B, a second queue for events inbound from the monitoring APIs 126C, a third queue for events outbound from the alarm history service 706, and a fourth queue for alarm states outbound from the alarm history service 706. Examples of processes that the alarm event queues 704 are configured to implement in various examples are described further below with reference to FIG. 10.

Continuing with the example of FIG. 7, the alarm history service 706 is configured to retrieve events from the alarm event queues 704, organize the events into lists by alarm, and publish the organized lists to the app hub 126A for delivery to the customer interface 132A. In certain examples, the alarm history service 706 maintains and refers to a filter that prevents and/or allows enumerated types of events to be passed to the app hub 126A. Examples of processes that the alarm history service 706 is configured to implement in various examples are described further below with reference to FIG. 10.

As described above, in some examples, a customer interface (e.g., the customer interface 132A of FIG. 7), which may be a smartphone app in certain examples, is configured to implement a consolidated alarm screen. Turning now to FIG. 8, a process 800 implemented by the customer interface, in some examples, to provision a consolidated alarm screen is illustrated. As shown in FIG. 8, the process 800 starts with the customer interface controlling a mobile computing device (e.g., the customer device 122 of FIG. 7) that hosts the customer interface to render 802 a consolidated alarm screen via a touchscreen of the mobile computing device. FIG. 9 illustrates one example of a consolidated alarm screen 900 that can be rendered in some examples. As shown in FIG. 9, the screen 900 includes a cancel button 902, a send police button 904, a chronology control group 906, and a go live control group 908. The chronology control group 906 includes an expansion control 910 and a recordings control 912. The go live control group 908 includes a front door button 914 and a living room button 916.

The controls included in the screen 900 provide a holistic perspective of an alarm to a user. Through these controls a user can identify a device that triggered the alarm, gain access to sensor data that triggered the alarm, review actions taken to address the alarm, ascertain the current status of the alarm and the location-based devices that triggered the alarm, and participate in resolution of the alarm. For instance, in some examples, the user can select the cancel alarm button 902 to initiate an alarm cancellation process as described below with reference to FIGS. 12A and 12B. In some examples, the user can select the send police button 904 to initiate a request help process as described below with reference to FIG. 11.

Figure 14:
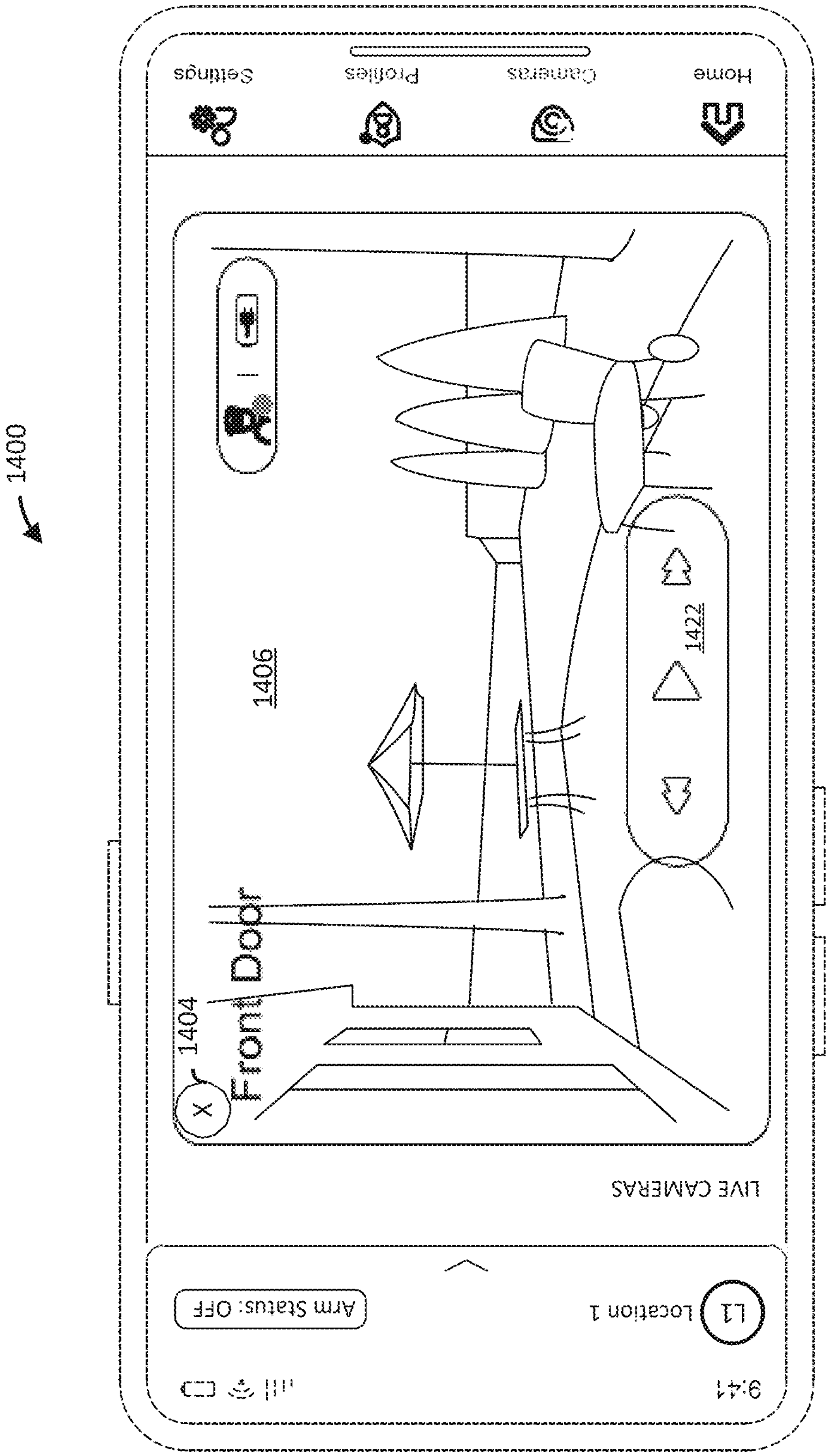
FIG. 14 is a front view of a user interface screen to display content from a camera, according to some examples described herein.

Continuing with the example of FIG. 9, the chronology control group 906 is configured to display a list of events observed and actions taken related to an alarm. In some examples, the user can select the expansion control 910 to toggle the chronology control group 906 between an expanded and contracted state. When the expansion control 910 is in an expanded state, the customer interface devotes more space within the screen 900 to the list of events observed and actions taken. When the expansion control 910 is in a contracted state, the customer interface devotes less space within the screen 900 to the list. As illustrated in FIG. 9, the expansion control 910 is in a contracted state. As shown in FIG. 9, the user can select the recordings control 912 to access sensor data (e.g., audio-visual recordings) that triggered the alarm. FIG. 14, which is described further below, illustrates one example of a camera screen 1400 that the customer interface can control its host device to render in some examples.

Continuing with the example of FIG. 9, the go live control group 908 includes controls that enable the user to establish a real time communication session between the device hosting the customer interface and one or more location-based devices residing at the location at which the alarm was triggered. As shown in FIG. 9, the user can select the front door button 914 to access a camera included in the doorbell of the location and can select the living room button 916 to access a camera associated with the living room at the location. In some examples, the user can interact with (e.g., see and/or speak with) an individual at the location via the real time communication session.

Returning to the process 800 with reference to FIG. 8, the customer interface receives 804 input selecting a control of the screen 900. For instance, in some examples, the customer interface receives a message from an operating system or other code (e.g., a runtime engine of a development platform, a virtual machine, etc.) executing on the mobile computing device. The message may include information regarding an interaction between the touchscreen and a user. For instance, the message may specify a location, duration of contact(s), and any movement detected on the touchscreen. Alternatively or additionally, the message may specify an identifier of a control of the home screen and a type of selection (e.g., a tap, a double tap, a swipe, a long press, etc.).

Continuing with the process 800, the customer interface determines 806 which control is selected by the input. For instance, in some examples, the customer interface identifies the control of the screen 900 selected and the type of selection based on the received message. In some examples, the customer interface makes this determination by identifying the location specified in the message as being within an area of the touchscreen occupied by the control and by classifying the selection type using the duration of contact(s) specified in the message. Alternatively or additionally, the customer interface may make this determination by reading an identifier of the control and the type of selection from the message.

Continuing with the process 800, if the customer interface determines that the cancel button 902 is selected, the customer interface initiates 808 an alarm cancellation process, such as the alarm cancellation process described further below with reference to FIGS. 12A and 12B. If the customer interface determines that the send police button 904 is selected, the customer interface initiates 810 a request help process as described below with reference to FIG. 11. If the customer interface determines that the expansion control 910 is selected, the customer interface toggles 812 the state of the expansion control and controls the mobile computing device to re-render the screen 900. If the customer interface determines that the recordings control 912 was selected, the customer interface initiates a recording review process by provisioning a camera screen. One example of a camera screen provisioning process is described further below with reference to FIG. 13. If the customer interface determines that either the front door button 914 or the living room button 916 is selected, the customer interface initiates 814 a real time communication session between the mobile computing device and the location-based device associated with the selected button.

Figure 10:
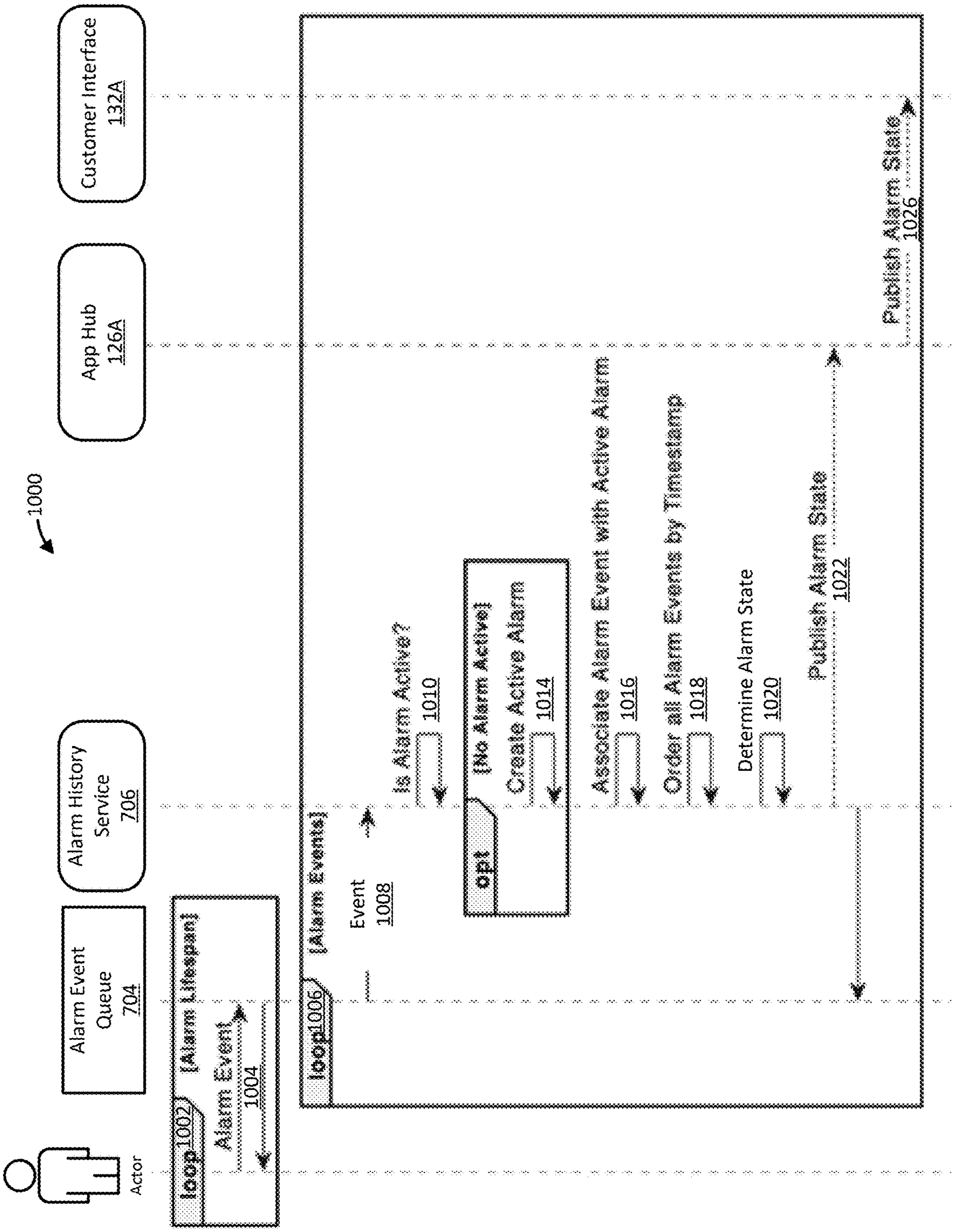
FIG. 10 is a sequence diagram illustrating an alarm generation process, according to some examples described herein.

Turning now to FIG. 10, a reporting process 1000 that supplies a consolidated alarm screen (e.g., the screen 900 of FIG. 9) with a comprehensive list of events related to a particular alarm is illustrated as a sequence diagram. The process 1000 can be executed, in some examples, by a security system (e.g., the security system 100 of FIG. 1). More specifically, in some examples, at least a portion of the process 1000 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1000 is executed by a customer device (e.g., the customer device 122 of FIG. 7) under control of a customer interface (e.g., customer interface 132A of FIG. 7).

As shown in FIG. 10, the process 1000 starts with a loop 1002 in which an alarm event queue (e.g., one or more of the alarm event queues 704 of FIG. 7) repeatedly receives 1004 one or more reportable events as a result of actors interacting with parts of the security system. Examples of an interaction that may result in the one or more events being added to the alarm event queue include an interaction between a customer and the customer interface, an interaction between monitoring personnel and a monitor interface (e.g., the monitor interface 130A of FIG. 7), and an interaction (albeit voluntary or involuntary) between an individual at the location 102A and one of the location-based devices 114, 110, and 106. The events that can be added to the queue include any of the events described herein. In some examples, individual instance of the loop 1002 execute until handling of the alarm that initiated the individual instance is complete.

Continuing with the process 1000, another loop 1006 iterates through a sequence of operations in which events are processed and published to subscribers, such as the customer interface 132A. As shown in FIG. 10, the loop 1006 starts with the alarm event queue communicating an event 1008 to an alarm history service (e.g., the alarm history service 706 of FIG. 7). For instance, in some examples, the alarm event queue sends a message specifying or identifying the event 1008 to the alarm history service. The message and/or the event 1008 may specify a location from which the event 1008 originated.

Continuing with the process 1000, the alarm history service determines 1010 whether an active alarm has been recorded for the location specified in the message. For instance, in some examples, the alarm history service accesses a data structure stored in memory that lists active alarms by location. In these examples, if the alarm history service is unable to find an active alarm for the location specified in the message within the list, the alarm history service creates 1014 an identifier of an active alarm and stores, within the list, the identifier of the active alarm in association with the location specified in the message.

Continuing with the process 1000, the alarm history service associates 1016 the event 1008 with the active alarm. For instance, in some examples, to associate the event 1008 with the active alarm, the alarm history service stores, within a data structure allocated in memory, a record that includes the event 1008 and the identifier of the active alarm.

Continuing with the process 1000, the alarm history service sorts 1018 events associated with the active alarm by a timestamp associated with individual events. For instance, in some examples, the alarm history service initiates a query that returns events associated with the active alarm and that includes an ORDER BY TIMESTAMP clause to establish a sort order. It should be noted that the timestamp associated with an event may be a current timestamp assigned to the event when the event is created or, if no such timestamp exists for an event, when the event is received by transport services (e.g., the transport services 126 of FIG. 7).

Continuing with the process 1000, the alarm history service determines 1020 an alarm state for the active alarm based on the events associated therewith. For instance, in some examples, the alarm history service calculates a threat score, as described above with reference to FIG. 6 and stores the threat score in association with the active alarm (e.g., stores the threat score in a data structure along with the identifier of the active alarm). Alternatively or additionally, in some examples, the alarm history service determines multiple alarm states within the operation 1020. These states may include a monitoring state, a customer state, a dispatch state, and a disposition state. For instance, in some examples, the alarm history service includes, within the monitoring state, events related to monitoring (e.g., an assignment of the alarm to monitoring personnel, an update generated by monitoring personnel, or another event that indicates engagement by monitoring personnel with information regarding the alarm). The alarm history service may include, within the customer state, events related to customer interaction (e.g., notifications to the customer or customer contacts, verifications of alarm authenticity made by the customer, acknowledgements of existence of the alarm made by the customer, etc.). The alarm history service may include, within the dispatch state, events related to dispatch activity (e.g., notifications to the dispatcher, dispatch status, information regarding first responders, etc.). The alarm history service may include, within the disposition state, events related to ultimate resolution of the alarm (e.g., authentic alarm, false alarm, etc.).

Continuing with the process 1000, the alarm history service stores the alarm state with the active alarm in one or more of the alarm event queues and publishes 1022 the alarm state and the timestamp-ordered list of events associated with the alarm to an app hub (e.g., the app hub 126A of FIG. 7). For instance, in some examples, the alarm history service sends a message to the app hub that identifies the alarm state and the list of events. The app hub, in turn, communicates (e.g., via the WebSocket connection described above) the alarm state and the list of events 1026 to the customer interface for display in a chronology control group (e.g., the chronology control group 906 of FIG. 9). Alternatively or additionally, in some examples, the alarm history service publishes 1022 alarm states and timestamp-ordered lists of events for all alarms, for active alarms by location, and/or for most recent alarms by location. Publication of this information may allow the customer interface to display information regarding the most recent alarm after the alarm is no longer active.

Figure 11:
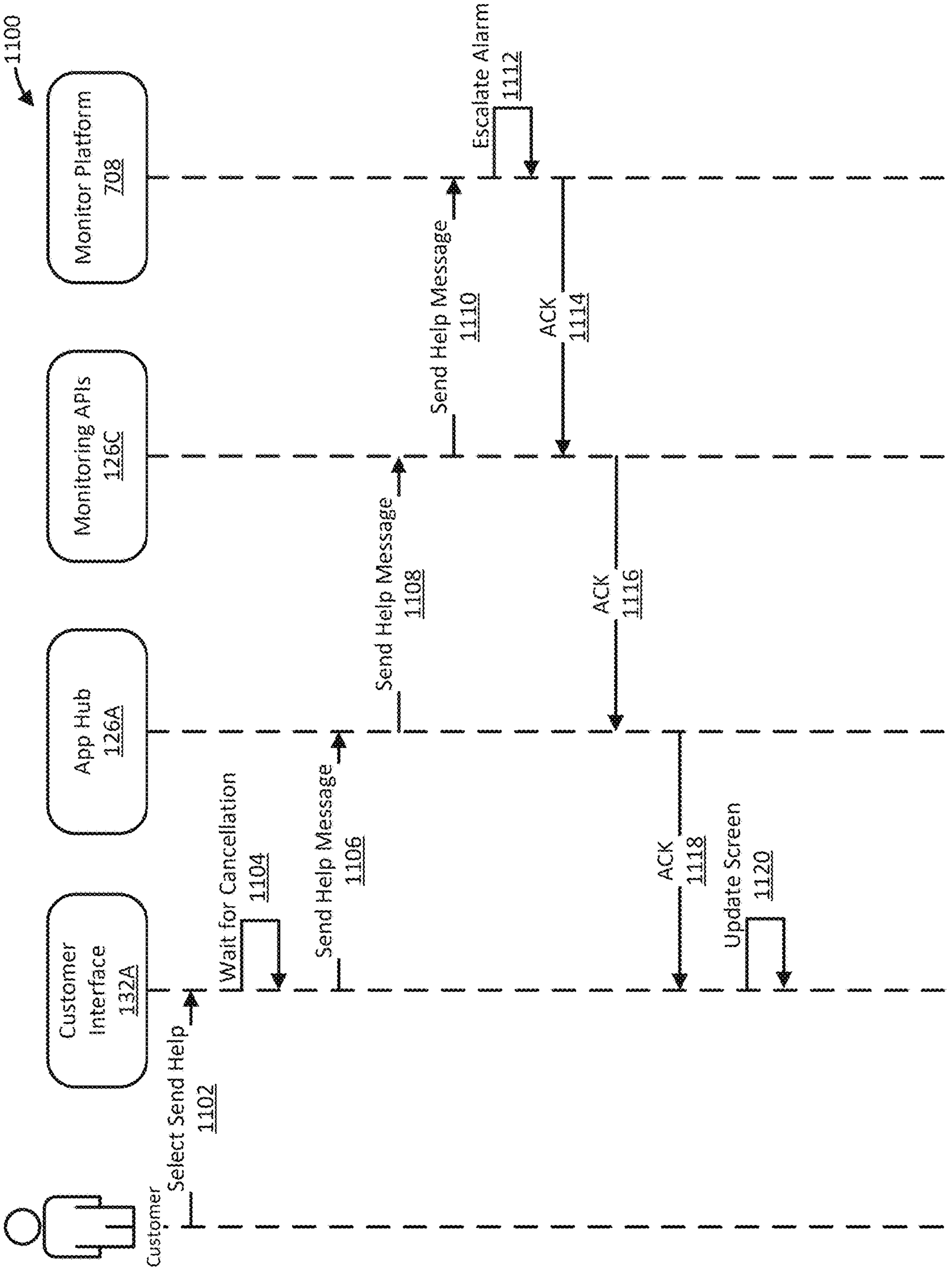
FIG. 11 is a sequence diagram illustrating a help request process, according to some examples described herein.

Turning now to FIG. 11, a help request process 1100 initiated in response to selection of a send police button (e.g., the send police button 904 of FIG. 9) is illustrated as a sequence diagram. The process 1100 can be executed, in some examples, by a security system (e.g., the security system 100 of FIG. 1). More specifically, in some examples, at least a portion of the process 1100 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1100 is executed by a customer device (e.g., the customer device 122 of FIG. 7) under control of a customer interface (e.g., the customer interface 132A of FIG. 7). At least a portion of the process 1100 is executed by a monitoring center environment (e.g., the monitoring center environment 120 of FIG. 7) under control of a monitor platform (e.g., monitor platform 708 of FIG. 7).

As shown in FIG. 11, the process 1100 starts with the customer interface receiving 1102 input from a user that selects the send police button. For instance, in some examples, the customer interface is an customer interface that displays a consolidated alarm screen (e.g., the consolidated alarm screen 900 of FIG. 9) including the send police button, and a customer taps the send police button. In this example, the customer interface receives the tap as a notification from an operating system of the customer device.

Continuing with the process 1100, the customer interface waits 1104 for a configurable amount of time before proceeding to ensure that selection of the send police button was not received in error. For instance, in some examples, the customer interface executes a timer set to expire after a duration equal to the amount of time. The amount of time waited varies between examples and can be 5 seconds, 10 seconds, 15 seconds, or some other amount of time. During this time the customer interface will accept a user instruction to cancel to request.

Continuing with the process 1100, the customer interface communicates a send help message 1106 to an app hub (e.g., the app hub 126A of FIG. 7). For instance, in some examples, the customer interface transmits the message 1106 to the app hub via a WebSocket connection previously established between the two processes. Alternatively, in some examples, the customer interface transmits the message 1106 as a REST POST request. The message 1106 may identify the alarm and the location from which the alarm originated, among other information regarding the alarm.

Continuing with the process 1100, the app hub communicates a send help message 1108 to at least one monitoring API (e.g., one of the monitoring APIs 126C of FIG. 7). For instance, in some examples, the app hub transmits the message 1108 to the monitoring API via one or more inter-process communications. The message 1108 may identify the alarm and the location from which the alarm originated, among other information regarding the alarm.

Continuing with the process 1100, the monitoring API communicates a send help message 1110 to a monitor platform (e.g., the monitor platform 708 of FIG. 7). For instance, in some examples, the monitoring API transmits the message 1110 to the monitor platform via a WebSocket connection between the two processes. The message 1110 may identify the alarm and the location from which the alarm originated, among other information regarding the alarm.

Continuing with the process 1100, the monitor platform escalates 1112 the alarm. For instance, in some examples, the monitor platform increases a priority of the alarm within an alarm queue maintained by the monitor platform. One or more monitor interfaces (e.g., the monitor interface 130A of FIG. 7) may, in response to the increased priority, highlight a representation of the alarm within a GUI presented by the monitor interface. The type of highlighting (bold, underlining, audio accompaniment, etc.) varies between examples and can indicate that the alarm is verified and help from a first responder is requested.

Continuing with the process 1100, the monitor platform acknowledges 1114 receipt and processing of the message 1110. For instance, in some examples, the monitor platform transmits an acknowledgement message to the monitoring API via the WebSocket connection used to communicate the message 1110. The acknowledgement message may identify the send help message being acknowledged.

Continuing with the process 1100, the monitoring API acknowledges 1116 receipt and delivery of the message 1108. For instance, in some examples, the monitor API transmits an acknowledgement message to the app hub via an inter-process communication. The acknowledgement message may identify the send help message being acknowledged.

Continuing with the process 1100, the app hub acknowledges 1118 receipt and delivery of the message 1106. For instance, in some examples, the app hub transmits an acknowledgement message to the customer interface via the WebSocket connection used to communicate the message 1106. The acknowledgement message may identify the send help message being acknowledged.

Continuing with the process 1100, the customer interface updates 1120 the consolidated alarm screen to indicate that selection of the send police button has been processed. For instance, in some examples, the customer interface updates a chronology displayed in a chronology control group (e.g., the chronology control group 906 of FIG. 9) to include an event detailing escalation of the alarm by monitoring personnel. After completion of the operation 1120, the process 1100 may end.

Although the description of the process 1100 focuses on sending police in response to an alarm, it should be noted that other first responders may be sent in response to an alarm, depending on the type of alarm triggered. For instance, a temperature or smoke alarm may be escalated by monitoring personnel to a fire department. In a similar fashion, a medical alarm may be escalated by monitoring personnel to emergency medical services. Other examples will be apparent in light of this disclosure.

Figure 12A:
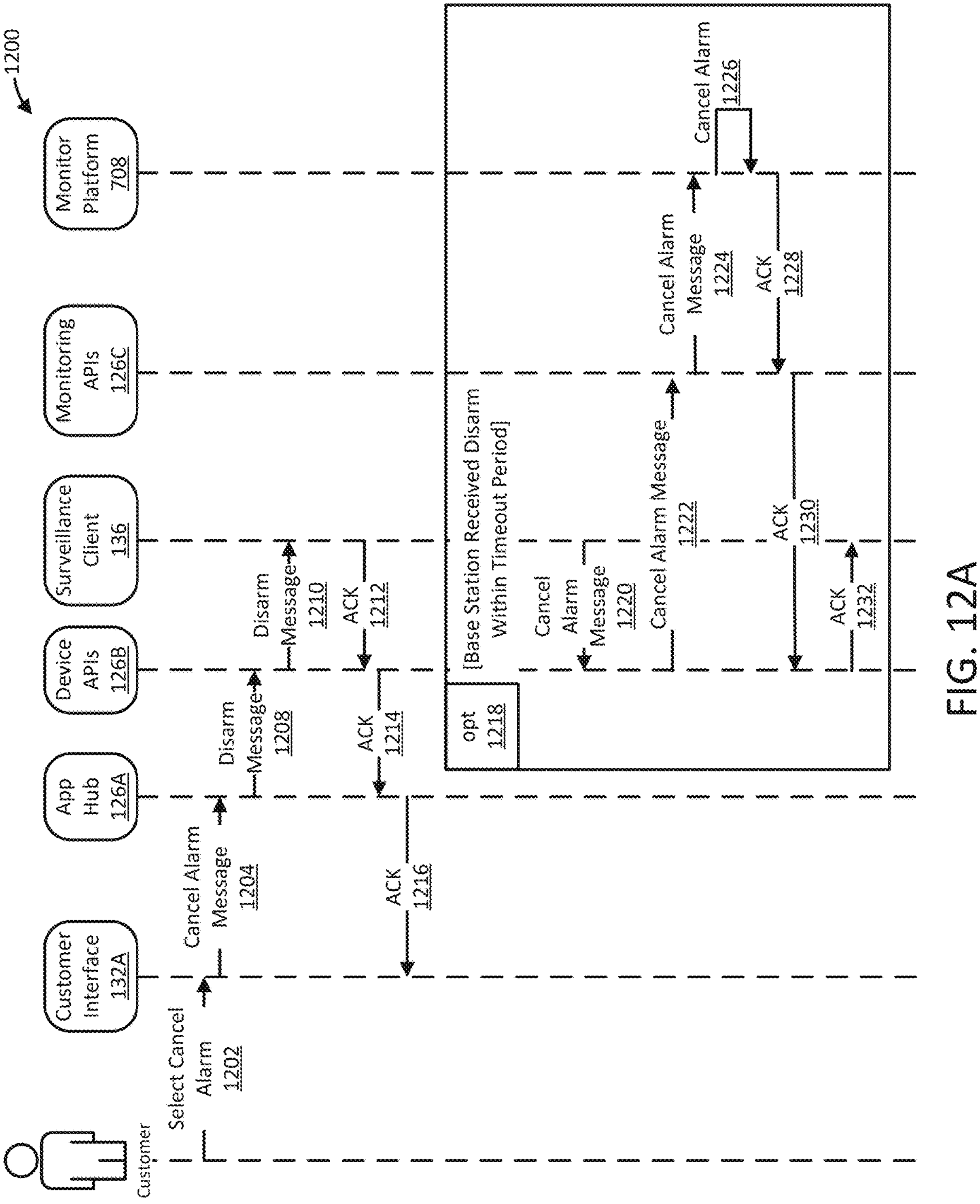
FIGS. 12A and 12B are a sequence diagram illustrating an alarm cancellation process, according to some examples described herein.
Figure 12B:
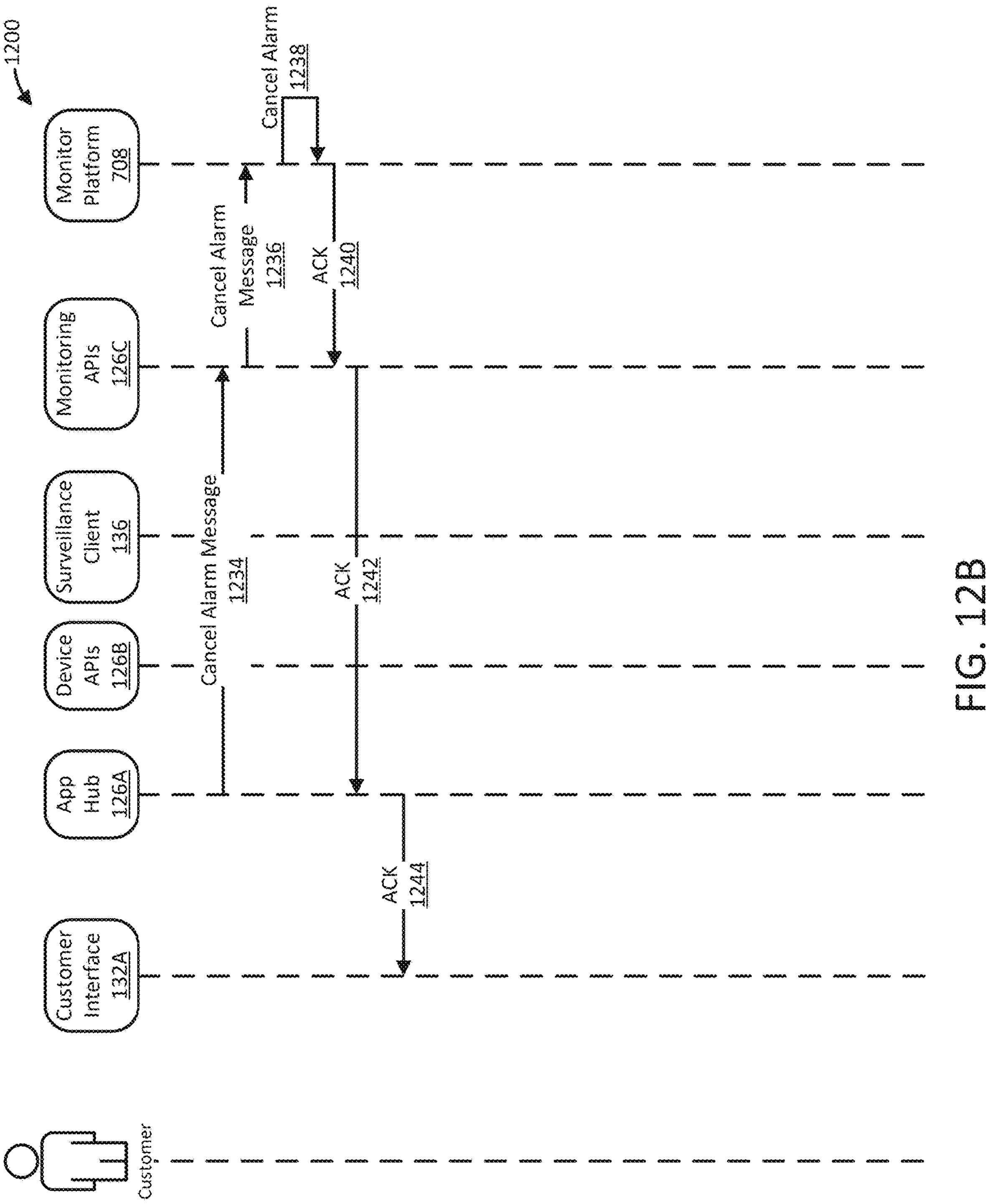

Turning now to FIGS. 12A and 12B, a cancel alarm process 1200 that is initiated in response to selection of a cancel alarm button (e.g., the cancel alarm button 902 of FIG. 9) is illustrated as a sequence diagram. The process 1200 can be executed, in some examples, by a security system (e.g., the security system 100 of FIG. 1). More specifically, in some examples, at least a portion of the process 1200 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1200 is executed by a customer device (e.g., the customer device 122 of FIG. 7) under control of a customer interface (e.g., the customer interface 132A of FIG. 7). At least a portion of the process 1200 is executed by a monitoring center environment (e.g., the monitoring center environment 120 of FIG. 7) under control of a monitor platform (e.g., the monitor platform 708 of FIG. 7). At least a portion of the process 1200 is executed by a base station (e.g., the base station 114 of FIG. 7) under control of a surveillance client (e.g., the surveillance client 136 of FIG. 1).

As shown in FIG. 12A, the process 1200 starts with the customer interface receiving 1202 input from a user that selects the cancel alarm button. For instance, in some examples, the customer interface is an app that displays a consolidated alarm screen (e.g., the consolidated alarm screen 900 of FIG. 9) including the cancel alarm button, and a customer taps the cancel alarm button after becoming convinced, from the information accessible via the consolidated alarm screen, that no help is needed and the alarm should be cancelled. In this example, the app receives a notification from an operating system of the customer device. This notification indicates the user tapped the cancel alarm button.

Continuing with the process 1200, the customer interface communicates a cancel alarm message 1204 to an app hub (e.g., the app hub 126A of FIG. 7). For instance, in some examples, the customer interface transmits the message 1204 to the app hub via a WebSocket connection previously established between the two processes. Alternatively, in some examples, the customer interface transmits the message 1204 as a REST POST request. The message 1204 may identify the alarm, the location, and/or the base station from which the alarm originated, among other information regarding the alarm.

Continuing with the process 1200, the app hub communicates a disarm message 1208 to at least one device API (e.g., one of the device APIs 126B of FIG. 7). For instance, in some examples, the app hub transmits the message 1208 to the device API via an inter-process communication. The message 1208 may identify the alarm, the location, and/or the base station from which the alarm originated, among other information regarding the alarm.

Continuing with the process 1200, the device API communicates a disarm message 1210 to a surveillance client (e.g., the surveillance client 136 of FIG. 1) that originated the alarm. For instance, in some examples, the device API transmits the message 1210 to the surveillance client via a WebSocket connection previously established between the two processes. The message 1210 may identify the alarm, the location, and/or the base station from which the alarm originated, among other information regarding the alarm.

Continuing with the process 1200, the surveillance client acknowledges 1212 receipt of the message 1210. For instance, in some examples, the surveillance client transmits an acknowledgement message to the device API via the WebSocket connection used to communicate the message 1210. The acknowledgement message may identify the cancel alarm message being acknowledged.

Continuing with the process 1200, the device API acknowledges 1214 receipt and delivery of the message 1208. For instance, in some examples, the device API transmits an acknowledgement message to the app hub via an inter-process communication. The acknowledgement message may identify the cancel alarm message being acknowledged.

Continuing with the process 1200, the app hub acknowledges 1216 receipt and delivery of the message 1204. For instance, in some examples, the app hub transmits an acknowledgement message to the customer interface via the WebSocket connection used to communicate the message 1204. Alternatively, in some examples, the app hub transmits the acknowledgement message as a REST API response. The acknowledgement message may identify the cancel alarm message being acknowledged.

In some examples, upon receipt of the acknowledgement message communicated in the operation 1216, the customer interface updates the consolidated alarm screen to indicate that the surveillance client has received the disarm message 1210. For instance, in some examples, the customer interface updates a chronology displayed in a chronology control group (e.g., the chronology control group 906 of FIG. 9) to include a reportable event detailing reception of the request to disarm the location-based devices.

Continuing with the process 1200, the surveillance client determines 1218 whether the surveillance client received the message 1210 before expiration of a configurable timeout period. For instance, in some examples, the surveillance client starts a timer upon the triggering of an alarm. In these examples, if the surveillance client receives a disarm message prior to expiration of the timer, the surveillance client determines that the timeout period was not exceeded and proceeds to cancel the alarm. Example durations of configurable timeout periods include 30 seconds, 60 seconds, 90 seconds, and 120 seconds to name a few.

Continuing with the process 1200, the surveillance client communicates a cancel alarm message 1220 to at least one device API. For instance, in some examples, the surveillance client transmits the message 1220 to the device API via a WebSocket connection previously established between the two processes. The message 1220 may identify the alarm, the location, and/or the base station from which the alarm originated, among other information regarding the alarm.

Continuing with the process 1200, the device API communicates a cancel alarm message 1222 to at least one monitoring API (e.g., one of the monitoring APIs 126C of FIG. 7) and at least one alarm event queue (e.g., one of the alarm event queues 704 of FIG. 7, not shown in FIG. 12A or 12B). For instance, in some examples, the device API transmits the message 1222 to the monitoring API via an inter-process communication and enqueues a Cancel_Alarm event in the alarm event queue. The message 1222 may identify the alarm, the location, and/or the base station from which the alarm originated, among other information regarding the alarm.

Continuing with the process 1200, the monitoring API communicates a cancel alarm message 1224 to a monitor platform (e.g., the monitor platform 708 of FIG. 7). For instance, in some examples, the monitoring API transmits the message 1224 to the monitor platform via a WebSocket connection previously established between the two processes. The message 1224 may identify the alarm, the location, and/or the base station from which the alarm originated, among other information regarding the alarm.

Continuing with the process 1200, the monitor platform cancels 1226 the alarm. For instance, in some examples, the monitor platform changes the status of the alarm to cancelled within an alarm queue maintained by the monitor platform. One or more monitor interfaces (e.g., the monitor interface 130A of FIG. 7) may, in response to the cancellation, change a representation of the alarm to indicate the cancellation within a GUI presented by the monitor interface, thereby notifying monitoring personnel that further handling of the alarm is not required.

Continuing with the process 1200, the monitor platform acknowledges 1228 receipt and processing of the message 1224. For instance, in some examples, the monitor platform transmits an acknowledgement message to the monitoring API via the WebSocket connection used to communicate the message 1224. The acknowledgement message may identify the cancel alarm message being acknowledged.

Continuing with the process 1200, the monitoring API acknowledges 1230 receipt and delivery of the message 1222. For instance, in some examples, the monitoring API transmits an acknowledgement message to the device API via an inter-process communication. The acknowledgement message may identify the cancel alarm message being acknowledged.

Continuing with the process 1200, the device API acknowledges 1232 receipt and delivery of the message 1220. For instance, in some examples the device API transmits an acknowledgement message to the surveillance client via the WebSocket connection used to communicate the message 1220. The acknowledgement message may identify the cancel alarm message being acknowledged.

Continuing with the process 1200 with reference to FIG. 12B, in some examples, to ensure that monitoring personnel are notified of the alarm cancellation regardless of time at which the cancel alarm button was pressed, the process 1200 continues with the app hub communicating a cancel alarm message 1234 to at least one of the monitoring APIs. For instance, in some examples, the app hub transmits the message 1234 to the monitoring API via an inter-process communication. The message 1234 may identify the alarm, the location, and/or the base station from which the alarm originated, among other information regarding the alarm.

Continuing with the process 1200, the monitoring API communicates a cancel alarm message 1236 to the monitor platform. For instance, in some examples, the monitoring API transmits the message 1236 to the monitor platform via a WebSocket connection previously established between the two processes. Alternatively, in some examples, the monitoring API transmits the message 1236 as a REST POST request. The message 1236 may identify the alarm, the location, and/or the base station from which the alarm originated, among other information regarding the alarm.

Continuing with the process 1200, the monitor platform cancels 1238 the alarm. For instance, in some examples, the monitor platform changes the status of the alarm to cancelled within an alarm queue maintained by the monitor platform. One or more monitor interfaces may, in response to the cancellation, change a representation of the alarm to indicate the cancellation within a GUI presented by the monitor interface, thereby notifying monitoring personnel that further handling of the alarm is not required.

Continuing with the process 1200, the monitor platform acknowledges 1240 receipt and delivery of the message 1236. For instance, in some examples, the monitor platform transmits an acknowledgement message to the monitoring API via the WebSocket connection used to communicate the message 1236. Alternatively, in some examples, the monitor platform transmits the acknowledgement message as a REST API response. The acknowledgement message may identify the cancel alarm message being acknowledged.

Continuing with the process 1200, the monitoring API acknowledges 1242 receipt and delivery of the message 1234. For instance, in some examples, the monitoring API transmits an acknowledgement message to the app hub via an inter-process communication. The acknowledgement message may identify the cancel alarm message being acknowledged.

Continuing with the process 1200, the app hub acknowledges 1244 receipt and delivery of the message 1204. For instance, in some examples, the app hub transmits an acknowledgement message to the customer interface via the WebSocket connection used to communicate the message 1204. The acknowledgement message may identify the cancel alarm message being acknowledged. After completion of the operation 1244, the process 1200 may end.

In some examples, upon receipt of the acknowledgement message communicated in the operation 1244, the customer interface updates the consolidated alarm screen to indicate that selection of the cancel alarm button has been processed. For instance, in some examples, the customer interface updates a chronology displayed in a chronology control group (e.g., the chronology control group 906 of FIG. 9) to include a reportable event detailing cancellation of the alarm.

It should be noted that, in some examples, the app hub communicates the message 1208 and the message 1234 concurrently, so as to ensure that monitoring personnel are notified as quickly as possible of the user's selection of the cancel button. It should also be noted that, in some examples, the app hub communicates both of the messages 1208 and 1234 in response to receipt of the message 1204.

Figure 13:
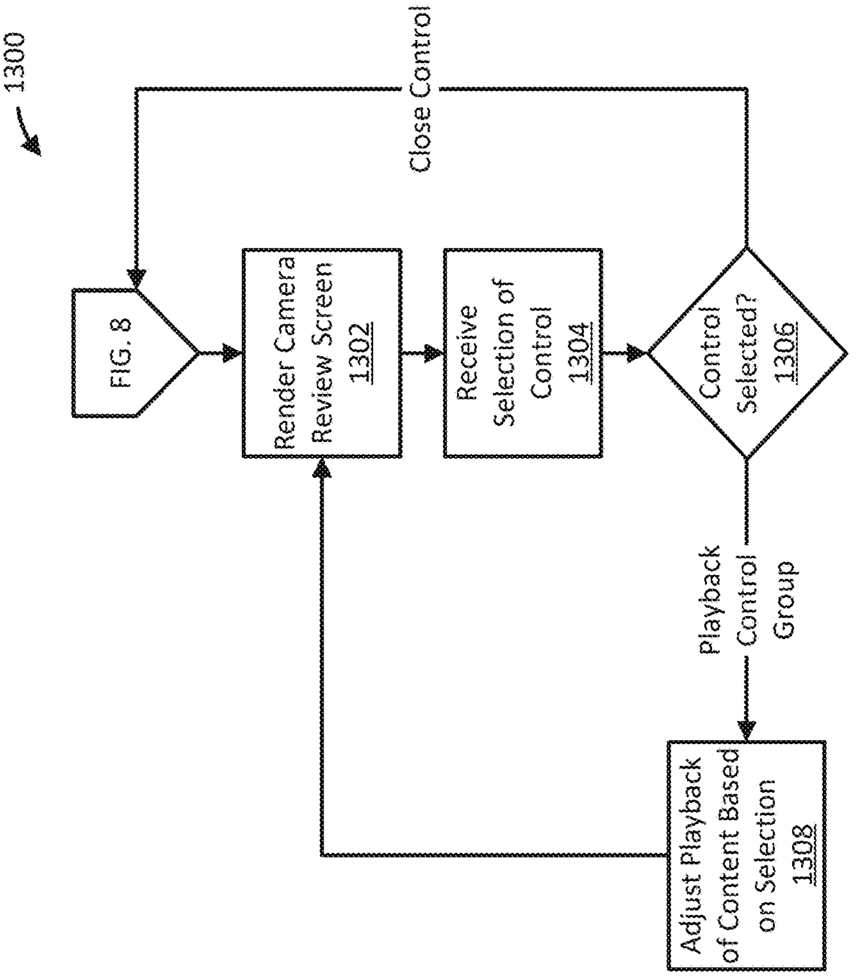
FIG. 13 is a flow diagram illustrating a provisioning process for a user interface screen to display content from a camera, according to some examples described herein.

Turning now to FIG. 13, a camera screen provisioning process 1300 that is initiated in response to selection of a recordings control (e.g., the recordings control 912 of FIG. 9) is illustrated as a sequence diagram. The process 1300 can be executed, in some examples, by a security system (e.g., the security system 100 of FIG. 1). More specifically, in some examples, at least a portion of the process 1300 is executed by a customer device (e.g., the customer device 122 of FIG. 7) under control of a customer interface (e.g., customer interface 132A of FIG. 7).

As shown in FIG. 13, the process 1300 starts with the customer interface, which may be a smartphone app, rendering 1302 a camera review screen via, for example, a touchscreen. FIG. 14 illustrates one example of a camera review screen 1400 that can be rendered in some examples. As shown in FIG. 14, the camera review screen 1400 includes a display area 1406, a close button 1404, and a playback control group 1422. Through the camera review screen 1400 and the controls included therein, the customer interface enables the user to view images captured by a specific camera. The user may select the close button 1404 to navigate to the consolidated alarm screen.

Returning to the process 1300, the customer interface receives 1304 input selecting a control of the screen 1400. For instance, in some examples, the customer interface receives the input selecting the control by executing the processing described above with reference to the operation 804 of FIG. 8.

Continuing with the process 1300, the customer interface determines 1306 which control of the screen 1400 is selected. For instance, in some examples, the customer interface identifies the control and the type of selection by executing the processing described above with reference to the operation 806 of FIG. 8.

Continuing with the process 1300, if the customer interface determines that the close button 1404 is selected, the customer interface returns to the previously executing process. If the customer interface determines that a control of the playback control group 1422 is selected, the customer interface adjusts 1308 playback of the camera content, within the display area 1406, in accordance with the selected control. Adjusting 1308 may include toggling between pause and play, adjusting volume, moving to a different location within the content, etc.

Figure 15:
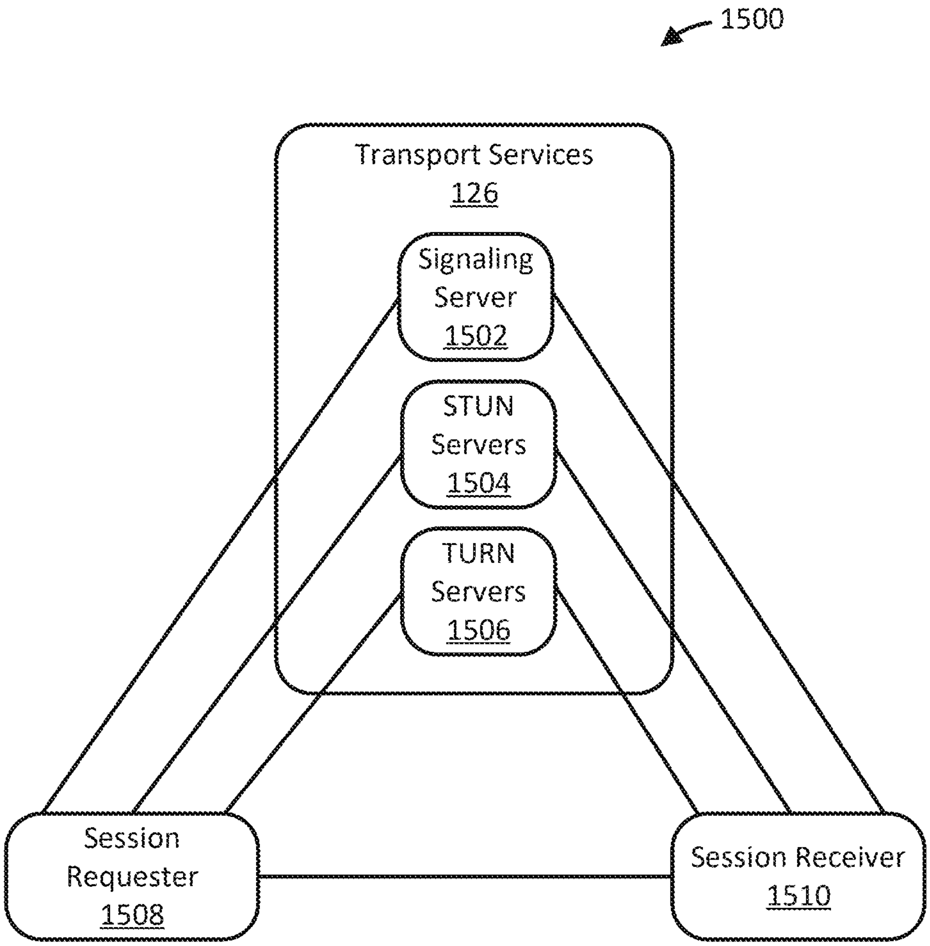
FIG. 15 is a schematic diagram of processes involved in establishing and conducting real time communication sessions, according to some examples disclosed herein.

Turning now to FIG. 15, a set of processes 1500 involved in establishing and conducting a communication session (e.g., a real time communication session) in response to selection of a go live control group 908 member (e.g., the front door button 914 or the living room button 916) of FIG. 9 is illustrated as a schematic diagram. As shown in FIG. 15, the set of processes 1500 includes the transport services 126, which are described above with reference to FIG. 7. As is further shown in FIG. 15, the transport services 126 include a signaling server 1502, one or more Session Traversal Utilities for Network Address Translators (STUN) servers 1504, and one or more Traversal Using Relays around Network Address Translators (TURN) servers 1506. The set of processes 1500 further includes a session requester 1508 and a session receiver 1510. The requester 1508 may be the monitor interface 130A or the customer interface 132A described above with reference to FIG. 7. The receiver 1510 may be the surveillance client 136 or a DCS (e.g., the camera agent 138 or another DCS) as described above with reference to FIG. 7.

In some examples, the requester 1508 is configured to communicate with the receiver 1510 via the signaling server 1502 to establish a real time communication session via, for example, a web real time communication (WebRTC) framework. The signaling server 1502 is configured to act as an intermediary or broker between the requester 1508 and the receiver 1510 while a communication session is established. As such, in some examples, an address (e.g., an IP address and port) of the signaling server 1502 is accessible to both the requester 1508 and the receiver 1510. For instance, the IP address and port number of the signaling server 1502 may be stored as configuration data in memory local to the devices hosting the requester 1508 and the receiver 1510. In some examples, the receiver 1510 is configured to retrieve the address of the signaling server 1502 and to register with the signaling server 1502 during initialization to notify the signaling server of its availability for real time communication sessions. In these examples, the requester 1508 is configured to retrieve the address of the signaling server 1502 and to connect with the signaling server 1502 to initiate communication with the receiver 1510 as part of establishing a communication session with the receiver 1510. In this way, the signaling server 1502 provides a central point of contact for a host of requesters including the requester 1508 and a central point of administration of a host of receivers including the receiver 1510.

Continuing with the example of FIG. 15, the STUN servers 1504 receive, process, and respond to requests from other devices seeking their own public IP addresses. In some examples, individual requesters 1508 and the receiver 1510 are configured to interoperate with the STUN servers 1504 to determine the public IP address of its host device. The TURN servers 1506 receive, process, and forward WebRTC messages from one device to another. In some examples, individual requesters 1508 and the receiver 1510 are configured to interoperate with the TURN servers 1506, if a WebRTC session that utilizes the public IP addresses of the host devices cannot be established (e.g., a network translation device, such as a firewall, is interposed between the host devices).

In some examples, a requester 1508 exchanges interactive connectivity establishment (ICE) messages with the STUN servers 1504 and/or the TURN servers 1506. Via this exchange of the messages, the requester 1508 generates one or more ICE candidates and includes the one or more ICE candidates within a message specifying an SDP offer. Next, the requester 1508 transmits the message to the signaling server 1502, and the signaling server 1502 transmits the message to the receiver 1510. The receiver 1510 exchanges ICE messages with the STUN servers 1504 and/or the TURN servers 1506, generates one or more ICE candidates and includes the one or more ICE candidates within a response specifying an SDP answer. Next, the receiver 1510 transmits the response to the signaling server 1502, and the signaling server 1502 transmits the response to the requester 1508. Via the messages, the requester 1508 and the receiver 1510 negotiate communication parameters for a real time communication session and open the real time communication session.

In some examples, while participating in the real time communication session, the receiver 1510 (e.g., the image capture device 110 of FIG. 7) collects audio-visual sensor data (e.g., through a camera and microphone of the image capture device 110) and transmits the audio-visual sensor data to the requester 1508. Further, in these examples, while participating in the real time communication session, the receiver 1510 outputs audio (e.g., via a speaker within the image capture device 110) received from the requester 1508. In a similar fashion, while participating in the real time communication session, the requester 1508 renders (e.g., via a display and speaker in the customer device 122 of FIG. 7) the audio-visual sensor data collected by the receiver 1510. Further, while participating in the real time communication session, the requestor 1508 collects audio data (e.g., through a microphone of the customer device 122) and transmits the audio data to the receiver 1510. In this way, a customer or monitoring agent can interact with an individual at a location in real time to help dispose of the alarm.

Figure 16:
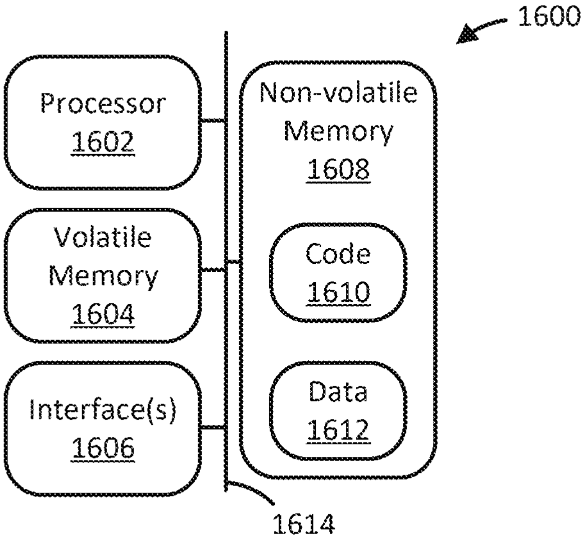
FIG. 16 is a schematic diagram of a computing device, according to some examples described herein.

Turning now to FIG. 16, a computing device 1600 is illustrated schematically. As shown in FIG. 16, the computing device includes at least one processor 1602, volatile memory 1604, one or more interfaces 1606, non-volatile memory 1608, and an interconnection mechanism 1614. The non-volatile memory 1608 includes code 1610 and at least one data store 1612.

In some examples, the non-volatile (non-transitory) memory 1608 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1610 stored in the non-volatile memory can include an operating system and one or more applications or programs that are configured to execute under the operating system. Alternatively or additionally, the code 1610 can include specialized firmware and embedded software that is executable without dependence upon a commercially available operating system. Regardless, execution of the code 1610 can result in manipulated data that may be stored in the data store 1612 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 16, the processor 1602 can be one or more programmable processors to execute one or more executable instructions, such as a computer program specified by the code 1610, to control the operations of the computing device 1600. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1604) and executed by the circuitry. In some examples, the processor 1602 is a digital processor, but the processor 1602 can be analog, digital, or mixed. As such, the processor 1602 can execute the function, operation, or sequence of operations using digital values and/or using analog signals. In some examples, the processor 1602 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1602 that are multicore can provide functionality for parallel, simultaneous execution of instructions or for parallel, simultaneous execution of one instruction on more than one piece of data.

Continuing with the example of FIG. 16, prior to execution of the code 1610 the processor 1602 can copy the code 1610 from the non-volatile memory 1608 to the volatile memory 1604. In some examples, the volatile memory 1604 includes one or more static or dynamic random access memory (RAM) chips and/or cache memory (e.g. memory disposed on a silicon die of the processor 1602). Volatile memory 1604 can offer a faster response time than a main memory, such as the non-volatile memory 1608.

Through execution of the code 1610, the processor 1602 can control operation of the interfaces 1606. The interfaces 1606 can include network interfaces. These network interfaces can include one or more physical interfaces (e.g., a radio, an ethernet port, a USB port, etc.) and a software stack including drivers and/or other code 1610 that is configured to communicate with the one or more physical interfaces to support one or more LAN, PAN, and/or WAN standard communication protocols. The communication protocols can include, for example, TCP and UDP among others. As such, the network interfaces enable the computing device 1600 to access and communicate with other computing devices via a computer network.

The interfaces 1606 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1610 that is configured to communicate with the user input and/or output devices. As such, the user interfaces enable the computing device 1600 to interact with users to receive input and/or render output. This rendered output can include, for instance, one or more GUIs including one or more controls configured to display output and/or receive input. The input can specify values to be stored in the data store 1612. The output can indicate values stored in the data store 1612.

Continuing with the example of FIG. 16, the various features of the computing device 1600 described above can communicate with one another via the interconnection mechanism 1614. In some examples, the interconnection mechanism 1614 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising receiving, by a computing device, first data from a sensor, the first data including a first timestamp and an event that triggered an alarm; receiving, by the computing device, second data from a remote computing environment, the second data including a second timestamp different from the first timestamp and specifying an action taken in response to the alarm; and rendering a screen on a display of the computing device, the screen including the first and second data represented as a sequence of events ordered by time based on the first and second timestamps.

Example 2 includes the subject matter of Example 1, wherein the second data was generated by a monitor interface and specifies that the action was taken by monitoring personnel.

Example 3 includes the subject matter of Example 2, wherein the second data specifies a call to a Public Safety Answering Point.

Example 4 includes the subject matter of either Example 2 or Example 3 and further comprises receiving third data that includes a third timestamp and generated by a customer interface, the third data being indicative of a particular action taken by a customer in response to the alarm; and storing the third data in the sequence.

Example 5 includes the subject matter of any of Examples 1-4, wherein the second data was generated by a customer interface and specifies that the action was taken by a customer.

Example 6 includes the subject matter of Example 5, wherein the action taken includes a request to send a first responder to a location associated with the alarm.

Example 7 includes the subject matter of either Example 5 or Example 6, wherein the action taken includes a request to cancel the alarm.

Example 8 includes the subject matter of any of Examples 5-7, wherein the action taken includes a request to access a recording of the first data.

Example 9 includes the subject matter of any of Examples 5-8, wherein the action taken includes a request to initiate an interactive communication session via a device comprising the sensor.

Example 10 includes the subject matter of any of Examples 1-9, wherein rendering the screen further comprises rendering a control configured to initiate cancellation of the alarm.

Example 11 includes the subject matter of any of Examples 1-10, wherein rendering the screen further comprises rendering a control configured to initiate a request to send help to a location associated with the alarm.

Example 12 includes the subject matter of any of Examples 1-11, wherein rendering the screen further comprises rendering a control configured to initiate access to a recording of the first data.

Example 13 includes the subject matter of any of Examples 1-12, wherein rendering the screen further comprises rendering a control configured to expand a portion of the consolidated alarm screen comprising the representation of the sequence.

Example 14 includes the subject matter of any of Examples 1-13, wherein rendering the screen further comprises rendering a control configured to initiate a communication session involving a device housing the sensor.

Example 15 includes the subject matter of any of Examples 1-14, wherein rendering the control configured to initiate the communication session comprises rendering a control configured to initiate an interactive communication session.

Example 16 includes the subject matter of any of Examples 1-15, wherein the first data triggered the alarm; and rendering the screen further comprises rendering an indication that the first data triggered the alarm.

Example 17 is a system comprising a memory; a network interface; and at least one processor coupled with the memory and the network interface and configured to receive, via the network interface, first data including a first timestamp and an event that triggered an alarm; receive, via the network interface, second data from a remote computing environment, the second data including a second timestamp different from the first timestamp and specifying an action taken in response to the alarm; and communicate, via the network interface for rendering on a remote device, a sequence of events based on the first and second data and ordered by time based on the first and second timestamps.

Example 18 includes the subject matter of Example 17, wherein the second data specifies that the action was taken by monitoring personnel.

Example 19 is a method comprising: rendering, by the computing device, a screen including a first control displaying a sequence of events regarding an alarm, a second control configured to receive user input cancelling the alarm, and a third control configured to receive user input escalating the alarm; receiving, by the computing device via the second control, the user input cancelling the alarm; and communicating, to a remote computing device, a request to cancel the alarm in response to reception of the user input cancelling the alarm.

Example 20 includes the subject matter of Example 19, wherein the sequence of events is ordered by time and includes an event that triggered the alarm and an event indicating an action taken to address the alarm.

Use of ordinal terms such as "first", "second", "third", etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:

receiving, by a computing device, first data from a sensor that is deployed at a location, the first data including a first timestamp and an event that triggered an alarm;

receiving, by the computing device, second data from a remote computing environment, the second data including a second timestamp different from the first timestamp and specifying an action taken in response to the alarm;

organizing the first data and the second data into a list of events ordered by time based on the first timestamp and the second timestamp;

publishing the list of events to an app hub that is configured to interoperate with a customer interface that is hosted by a customer device; and sending, via the app hub, the list of events to the customer device.

2. The method of claim 1, further comprising:

storing the first data in a first queue that includes data characterizing events detected at the location; and storing the second data in a second queue that includes data received from the remote computing environment.

3. The method of claim 1, further comprising:

making a determination that the location has an active alarm;

after making the determination, storing the first data in a first queue that includes data characterizing events for the active alarm.

4. The method of claim 1, further comprising:

making a determination that no active alarms are pending for the location;

after making the determination, creating an identifier of an active alarm for the location; and storing the first data in a first queue that includes data characterizing events for the active alarm.

5. The method of claim 1, wherein the list of events is sent to the customer device via a WebSocket connection.

6. The method of claim 1, wherein the list of events includes an identifier for the alarm, the method further comprising, after sending the list of events to the customer device, receiving, from the customer device, a cancel alarm message that includes the identifier for the alarm.

7. The method of claim 1, wherein the list of events includes an identifier for the alarm, the method further comprising:

after sending the list of events to the customer device, receiving, from the customer device, a message indicating alarm cancellation, wherein the message indicating alarm cancellation includes the identifier for the alarm; and after receiving the message indicating alarm cancellation, sending a disarm message to a surveillance client that is deployed at the location.

8. The method of claim 1, further comprising:

receiving, from the customer device, a message indicating alarm cancellation;

associating the message indicating alarm cancellation with a third timestamp; and adding, to the list of events, a cancel alarm event that is associated with the third timestamp.

9. The method of claim 1, further comprising:

receiving, from the customer device, an incoming cancel alarm message; and after receiving the incoming cancel alarm message, sending, to the remote computing environment, an outgoing cancel alarm message.

10. A system comprising a memory, a network interface, and at least one processor coupled with the memory and the network interface, wherein the at least one processor is configured to:

receive, by a computing device, first data from a sensor that is deployed at a location, the first data including a first timestamp and an event that triggered an alarm;

receive, by the computing device, second data from a remote computing environment, the second data including a second timestamp different from the first timestamp and specifying an action taken in response to the alarm;

organize the first data and the second data into a list of events ordered by time based on the first timestamp and the second timestamp;

publish the list of events to an app hub that is configured to interoperate with a customer interface that is hosted by a customer device; and send, via the app hub, the list of events to the customer device.

11. The system of claim 10, wherein:

the second data was generated by a monitor interface; and the second data specifies that the action was taken by monitoring personnel.

12. The system of claim 10, wherein the second data specifies a call to a Public Safety Answering Point.

13. The system of claim 10, wherein the at least one processor is further configured to:

receive third data that includes a third timestamp, wherein the third data is generated by the customer interface at the customer device, and wherein the third data is indicative of a particular action taken by a customer in response to the alarm; and add, to the list of events, a customer action event that specifies the particular action taken by the customer.

14. The system of claim 10, wherein the at least one processor is further configured to receive third data from the customer device, wherein the third data is indicative of a particular action taken by a customer in response to the alarm, and wherein the particular action is a request to send a first responder to the location.

15. The system of claim 10, wherein the at least one processor is further configured to receive third data from the customer device, and wherein the third data is indicative of a request to cancel the alarm.

16. The system of claim 10, wherein the at least one processor is further configured to receive third data from the customer device, and wherein the third data is indicative of a request to initiate an interactive communication session via a device comprising the sensor.

17. One or more non-transitory computer readable storage media storing sequences of instructions executable by one or more processors, the sequences of instructions comprising instructions to:

receive, by a computing device, first data from a sensor that is deployed at a location, the first data including a first timestamp and an event that triggered an alarm;

receive, by the computing device, second data from a remote computing environment, the second data including a second timestamp different from the first timestamp and specifying an action taken in response to the alarm;

organize the first data and the second data into a list of events ordered by time based on the first timestamp and the second timestamp;

publish the list of events to an app hub that is configured to interoperate with a customer interface that is hosted by a customer device; and send, via the app hub, the list of events to the customer device.

18. The one or more non-transitory computer readable storage media of claim 17, wherein the list of events includes an identifier for the alarm, and wherein the sequences of instructions further comprise instructions to:

after sending the list of events to the customer device, receive, from the customer device, a message indicating alarm cancellation that includes the identifier for the alarm; and after receiving the message indicating alarm cancellation, send a disarm message to a surveillance client that is deployed at the location.

19. The one or more non-transitory computer readable storage media of claim 17, wherein the list of events includes an identifier for the alarm, the sequences of instructions further comprising instructions to, after sending the list of events to the customer device, receive, from the customer device, a message indicating alarm cancellation that includes the identifier for the alarm.

20. The one or more non-transitory computer readable storage media of claim 17, wherein the sequences of instructions further comprise instructions to:

make a determination that the location has an active alarm;

after making the determination, store the first data in a first queue that includes data characterizing events for the active alarm.

* * * * *